US007175892B2

(12) United States Patent
Funakoshi et al.

(10) Patent No.: US 7,175,892 B2
(45) Date of Patent: Feb. 13, 2007

(54) EMULSION AND COATING LIQUID AND RECORDING MEDIUM USING THE SAME

(75) Inventors: Shinji Funakoshi, Akishima (JP); Hiroaki Takanohashi, Yokosuka (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/474,919

(22) PCT Filed: Apr. 17, 2002

(86) PCT No.: PCT/JP02/03838

§ 371 (c)(1), (2), (4) Date: Oct. 16, 2003

(87) PCT Pub. No.: WO02/085634

PCT Pub. Date: Oct. 31, 2002

(65) Prior Publication Data

US 2004/0115370 A1 Jun. 17, 2004

(30) Foreign Application Priority Data

Apr. 18, 2001 (JP) ............................ 2001-119342
Apr. 18, 2001 (JP) ............................ 2001-119761
Apr. 25, 2001 (JP) ............................ 2001-127543

(51) Int. Cl.
*B32B 5/00* (2006.01)

(52) U.S. Cl. .................................... 428/34.4; 428/34.7

(58) Field of Classification Search .................. 428/32, 428/34

See application file for complete search history.

(56) References Cited

FOREIGN PATENT DOCUMENTS

| | | | |
|---|---|---|---|
| EP | 0692506 | A2 | 1/1996 |
| JP | 55-51583 | A | 4/1980 |
| JP | 56-148585 | A | 11/1981 |
| JP | 58-174408 | A | 10/1983 |
| JP | 58-201810 | A | 11/1983 |
| JP | 58-215413 | A | 12/1983 |
| JP | 62-243608 | A | 10/1987 |
| JP | 62-243609 | A | 10/1987 |
| JP | 63-117016 | A | 5/1988 |
| JP | 4-114011 | A | 4/1992 |
| JP | 7-1836 | A | 1/1995 |
| JP | 9-111133 | A | 4/1997 |
| JP | 9-111134 | A | 4/1997 |
| JP | 10-183022 | A | 7/1998 |
| JP | 10-237795 | A | 9/1998 |
| JP | 10-330691 | A | 12/1998 |
| JP | 11-61693 | A | 3/1999 |
| JP | 2000-218927 | A | 8/2000 |
| JP | 2000-220096 | A | 8/2000 |
| JP | 2000-248011 | A | 9/2000 |
| JP | 2001-180105 | A | 7/2001 |
| JP | 2001-253996 | A | 9/2001 |

*Primary Examiner*—Bruce Hess
(74) *Attorney, Agent, or Firm*—Birch, Stewart, Kolasch & Birch, LLP

(57) ABSTRACT

The present invention discloses a polymer emulsion used for manufacturing a recording medium, characterized in comprising at least a polymer compound (A) which shows hydrophilicity at a temperature region not higher than a specific temperature (temperature-sensitive point), whereas lipophilicity in a temperature region above the temperature-sensitive point.

6 Claims, No Drawings

EMULSION AND COATING LIQUID AND RECORDING MEDIUM USING THE SAME

This application is the national phase under 35 U.S.C. § 371 of PCT International Application No. PCT/JP02/03838 which has in International filling date of Apr. 17, 2002, which designated the United States of America.

TECHNICAL FIELD

The present invention relates to a recording medium such as paper, sheet, film and cloth used for printing and recording by a method in which an ink composition is adhered to said recording medium, a coating liquid used for manufacturing said recording medium, a method for efficiently manufacturing said recording medium, a polymer emulsion useful for manufacturing said recording medium and a method for manufacturing said polymer emulsion.

BACKGROUND ART

Use of an ink jet recording system has been promoted in various fields due to low noise in recording, easy coloring and capability of rapid recording. However, papers generally used in printing, such as wood free paper, are poor in ink absorption, drying and image quality such as resolution. Thus papers for an exclusive use with improved properties for the above problems have been proposed. For example, a recording paper coated with various inorganic pigments including amorphous silica to enhance coloring of ink and reproducibility, has been disclosed (for example, JP-A-55-51583 and JP-A-56-148585).

However, since further performance improvement in the recording medium side has been required along with progress in performance of ink jet printers, satisfactory performance can not be obtained at present by the above-described technology alone. In particular, an increase in ink discharge per unit area of recording medium has now been required to obtain an image quality as high as that of silver halide photograph. Thus, this demand brings about problems such as poor ink absorption and the occurrence of bleeding in the recording medium. This further requires transparency of an ink absorption layer and water resistance of the printed part after printing to realize high image quality, surface gloss and expression of color density equivalent to those of silver halide photograph.

With recent progress in technical development of an ink jet recording medium to obtain a high image quality equivalent to silver halide photograph, a recording medium is now commercially available, which gives an image quality similar to a photograph, by providing an ink absorption layer having micro-pores formed by inorganic fine particles on a highly smooth substrate such as a paper coated with polyolefin and a polymer film. However, in order to secure a sufficient ink absorption capacity on a substrate without ink absorption ability by using only said ink absorption layer, a very thick ink absorption layer of at least 35 μm must be formed. To obtain such a thick ink absorption layer, an uniform application of coating liquid in a thickness as thick as several times of the dry thickness is required. But it is difficult and troublesome to manufacture said recording medium efficiently while keeping a uniform film thickness even during the drying process. Furthermore, since it is recently required to use water as the solvent for the coating liquid in view of global environmental protection, said problem has become more critical because water requires generally a longer drying time than do organic solvents. Thus an effective solution is now needed.

As one of the solutions, a method for manufacturing a recording medium using a coating liquid containing polyvinyl alcohol and boric acid and/or borax together with inorganic fine particles has been disclosed (JP-A-2000-218927). Said coating liquid keeps a state of aqueous solution with a low viscosity at a relatively high temperature (about 40° C. or higher), whereas it shows thickening (gelling) at a low temperature in the region of around 15° C. Said coating liquid also shows similar thickening with a temperature change when it contains gelatin together with inorganic fine particles. A thick coating layer can be retained uniformly by utilizing said property. However, use of said water soluble polymers such as polyvinyl alcohol and gelatin has a problem of clogging micro-pores formed by inorganic fine particles, and in particular, use of gelatin makes this problem more critical. Use of polyvinyl alcohol and boric acid and/or borax also has a risk of water pollution caused by boron, in view of recent environmental regulations relating to water pollution becoming more strict regarding boron. Increasing the solids content of coating-liquid-containing-water soluble-polymers such as polyvinyl alcohol and gelatin, to reduce the amount of water to be evaporated; and reducing the drying time to save energy required for drying, causes problems such as difficulties in handling and uniform application of coating liquid on a substrate due to an abrupt increase in the viscosity of the coating liquid caused by the increase in concentration.

Furthermore, a binder composition using a polymer compound showing reversible change between hydrophilicity and lipophilicity at a specific temperature (temperature-sensitive point) (JP-A-2001-253996) and a method for manufacturing a recording medium utilizing said polymer compound (JP-A-2001-180105) and the like have been disclosed. All utilize the thickening effect by heating a low viscosity binder composition or a coating liquid prepared at a temperature range (not higher than the temperature-sensitive point) at which said polymer compound is hydrophilic, at a temperature not lower than the temperature-sensitive point. A coating layer obtained by using said binder composition or said coating liquid is poor in transparency, surface smoothness and surface gloss, and thus can not provide an ink jet recording medium giving a high image quality equivalent to silver halide photograph.

Thus, developments are needed for an ink jet recording medium sufficiently acceptable in view of image quality, global environmental preservation and energy saving, a coating liquid used for manufacturing said recording medium, an efficient method for manufacturing said recording medium, a polymer emulsion useful for manufacturing said recording medium and a method for manufacturing said polymer emulsion.

Furthermore, even in such recording medium as used in thermal recording printing by using coloring of an ink composition by heating, gravure printing, offset printing and other various printing systems as well as recording with recording tools such as a pen, developments are needed for a recording medium sufficiently acceptable in view of surface gloss, image quality, global environmental preservation and energy saving, a coating liquid used in manufacturing said coating medium, an efficient method for manufacturing said recording medium, a polymer emulsion useful for manufacturing said recording medium and a method for manufacturing said polymer emulsion.

DISCLOSURE OF THE INVENTION

An object of the present invention is to provide a recording medium superior in ink absorption, film forming ability, surface gloss and transparency; a coating liquid for said recording medium; a polymer emulsion used for said coating liquid; a method for manufacturing said polymer emulsion; and further an efficient method for manufacturing said recording medium.

The present inventors have found, after an extensive study, a solution to the above-described problems; a polymer emulsion used for manufacturing a recording medium, characterized in containing at least a polymer compound (A) which shows hydrophilicity at a temperature region not higher than a specific temperature (temperature-sensitive point), whereas lipophilicity at a temperature region above the temperature-sensitive point; a method for manufacturing said polymer emulsion; a coating liquid for a recording medium characterized in containing said emulsion; a recording medium characterized in forming at least one layer of coating layers by using said coating liquid; and a method for manufacturing said recording medium, and have thus accomplished the present invention. Namely, the present invention provides:

1) A polymer emulsion used for manufacturing a recording medium, comprising at least a polymer compound (A) which shows hydrophilicity at a temperature region not higher than a specific temperature (temperature-sensitive point) and lipophilicity in a temperature region above the temperature-sensitive point.

2) The polymer emulsion in accordance with invention 1), wherein said polymer emulsion contains a cationic surfactant.

3) The polymer emulsion in accordance with invention 1) or invention 2), wherein said polymer emulsion contains a cationic group.

4) The polymer emulsion in accordance with any one of inventions 1)–3), wherein said polymer emulsion contains a tertiary amine group and/or a quaternary ammonium salt group.

5) The polymer emulsion in accordance with any one of inventions 1)–4), wherein said polymer emulsion contains an anionic group.

6) The polymer emulsion in accordance with any one of inventions 1)–5), wherein said polymer emulsion contains particles composed of a core part comprising a particle (B) and a shell part comprising a polymer compound (A) locating around said core part.

7) The polymer emulsion in accordance with invention 6), wherein said particle (B) has a number average particle diameter of 3–50 nm as measured by a dynamic light scattering method.

8) The polymer emulsion in accordance with any one of inventions 1)–7), wherein said polymer emulsion contains a carbonyl group.

9) The polymer emulsion in accordance with any one of inventions 1)–8), wherein said polymer emulsion contains at least a polymer compound (A) obtained by polymerization in the presence of polyvinyl alcohol and/or a polyvinyl alcohol derivative.

10) The polymer emulsion in accordance with any one of inventions 1)–9), wherein said recording medium is an ink jet recording medium having at least one ink absorption layer on a substrate.

11) A method for manufacturing a polymer emulsion, comprising at least the step of preparing a polymer compound (A) in the presence of a particle (B) at a temperature region above a temperature-sensitive point.

12) The method for manufacturing a polymer emulsion in accordance with invention 11), wherein said particle (B) has a number average particle diameter of 3–50 nm as measured by a dynamic light scattering method.

13) A method for manufacturing a polymer emulsion, comprising at least the step of preparing a polymer compound (A) in the presence of a cationic surfactant at a temperature region above a temperature-sensitive point.

14) The method in accordance with any one of inventions 11)–13), wherein said polymer emulsion contains a cationic group.

15) The method in accordance with any one of inventions 11)–14), wherein said polymer emulsion contains a carbonyl group.

16) A coating liquid for recording medium containing the polymer emulsion in accordance with any one of inventions 1)–10).

17) A coating liquid for recording medium containing the polymer emulsion in accordance with any one of inventions 1)–10) and fine particles (C).

18) A coating liquid for recording medium containing the polymer emulsion in accordance with invention 8), fine particles (C) and a hydrazine derivative having at least two hydrazine groups and/or semicarbazide groups.

19) The coating liquid for recording medium in accordance with invention 17) or 18), wherein the fine particles (C) have a number average particle diameter DL of 3–200 nm as determined by a dynamic light scattering method.

20) The coating liquid for recording medium in accordance with any one of inventions 17)–19), wherein a difference of specific surface areas (SB-SL) of the fine particles (C) are not smaller than 100 $m^2/g$, wherein SB is a specific surface area as determined by nitrogen adsorption using a BET method and SL is a reduced specific surface area calculated from a number average particle diameter DL as measured by a dynamic light scattering method.

21) The coating liquid for recording medium in accordance with invention 17) or invention 18), wherein the fine particles (C) are manufactured using a metal oxide and/or a precursor thereof as a metal source, via the steps of (i) manufacturing a composite material by mixing and reacting the metal source, a template and water, and (ii) removing the template from said composite material, and said particles (C) have a number average particle diameter DL of 10–300 nm as measured by a dynamic light scattering method and a difference of specific surface areas (SB-SL) is not smaller than 250 $m^2/g$, wherein SB is a specific surface area as determined by nitrogen adsorption using a BET method and SL is a reduced specific surface area calculated from the number average particle diameter DL.

22) The coating liquid for recording medium in accordance with any one of inventions 16)–21), wherein thickening or gelling occurs when temperature is lowered to a temperature not higher than a temperature-sensitive point.

23) The coating liquid for recording medium in accordance with any one of inventions 17)–22), wherein said recording medium is an ink jet recording medium having at least one ink absorption layer on a substrate.

24) A method for manufacturing recording medium having at least one coating layer on a substrate, wherein a method for forming at least one layer of said coating layer(s) comprises applying the coating liquid in accordance with any one of inventions 16)–23) to a substrate at a temperature above a temperature-sensitive point of the polymer compound (A) and then cooling down to a temperature not higher than the temperature-sensitive point.

25) The method in accordance with invention 24), wherein said recording medium is an ink jet recording medium having at least one ink absorption layer on a substrate.

26) A recording medium having at least one coating layer on a substrate, wherein at least one layer of said coating layer(s) is formed from the coating liquid in accordance with any one of inventions 16)–23).

27) A recording medium having at least one coating layer on a substrate, wherein at least one layer of said coating layer(s) contains a polymer compound (A) contained in the polymer emulsion in accordance with any one of inventions 1)–10).

28) An ink jet recording medium having at least one coating layer on a substrate, wherein at least one of said coating layer(s) is a layer manufactured by the manufacturing method in accordance with invention 24).

BEST MODE FOR CARRYING OUT THE INVENTION

The present invention will be explained more in detail hereinbelow.

Polymer compound (A) used in the present invention, showing hydrophilicity at a temperature region not higher than a specific temperature (temperature-sensitive point) whereas lipophilicity at a temperature region above the temperature-sensitive point, is a homopolymer compound of a monomer [main monomer (M)] which provides said temperature responsibility (change between hydrophilicity and lipophilicity) to a polymer compound formed by homopolymerization thereof, a copolymer compound of two or more types of main monomers (M), and furthermore, a copolymer compound of a monomer [sub-monomer (N)], which can form a polymer compound by reacting with said main monomer (M) but can not provide a polymer compound showing said temperature responsibility by homopolymerization thereof, and a main monomer (M). Each of main monomer (M) and sub-monomer (N) may be used alone or in combination of two or more types.

Although a polymer compound with high temperature responsibility can be obtained by homopolymerization, said coplolymerization can provide a polymer compound with a temperature responsibility or film forming ability different from those of a homopolymer compound.

Main monomer (M) includes a N-alkyl or N-alkylene substituted (meth)acrylamide derivatives, wherein, (meth) acryl is simplified description of methacryl or acryl, and vinyl methyl ether, and specifically includes, for example, N-methyl(meth)acrylamide, N-isopropyl(meth)acrylamide, N-cyclopropyl(meth)acrylamide, N-ethyl(meth)acrylamide, N,N-diethylacrylamide, N,N-dimethyl(meth)acrylamide, N-n-propyl(meth)acrylamide, N-methyl-N-n-propylacrylamide, N-methyl-N-isopropylacrylamide, N-(meth)acryloylpyroridone, N-(meth)acryloylpiperidine, N-tetrahydrofurfuryl(meth)acrylamide, N-methoxypropyl(meth) acrylamide, N-ethoxypropyl(meth)acrylamide, N-isopropoxypropyl(meth)-acrylamide, N-ethoxyethyl (meth)acrylamide, N-(2,2-dimethoxyethyl)-N-methylacrylamide, N-methoxyethyl-(meth)acrylamide and N-(meth) acryloylmorpholine. N-isopropylacrylamide, N-n-propylacrylamide, N,N-diethylacrylamide and N-acryloylmorpholine are preferable in view of film forming ability.

Sub-monomer (N) includes a lipophilic vinyl compound, a hydrophylic vinyl compound and an ionic vinyl compound. A typical lipophilic vinyl compound includes methyl (meth)acrylate, ethyl (meth)acrylate, n-butyl (meth)acrylate, 2-ethylhexyl (meth)acrylate, glycidyl methacrylate, styrene, α-methylstyrene, ethylene, isoprene, butadiene, vinyl acetate and vinyl chloride. A typical hydrophilic vinyl compound includes 2-hydroxyethyl (meth)acrylate, 2-hydroxypropyl (meth)acrylate, (meth)acrylamide, N-methyl(meth) acrylamide, N-methylolacrylamide, diacetoneacrylamide, methylenebisacrylamide, 2-methyl-5-vinylpyridine, N-vinyl-2-pyrolidone, N-acryloylpyrolidine and acrylonitrile. An ionic vinyl compound includes a carboxyl group containing monomer such as acrylic acid, methacrylic acid, itaconic acid, fumaric acid, maleic acid, crotonic acid, butenetricarboxylic acid, monoethyl maleate, monomethyl maleate, monoethyl itaconate and monomethyl itaconate; a sulfonic acid group containing monomer such as 2-acrylamide-2-methylpropanesulfonic acid, styrene sulfonic acid, vinylsulfonic acid and (meth)acrylsulfonic acid; and an amino group containing monomer such as N,N-dimethylaminoethyl(meth)acrylate and N,N-diethylaminoethyl (meth)acrylate. Methyl (meth)acrylate, n-butyl(meth)acrylate, 2-ethylhexyl (meth)acrylate, styrene, 2-hydroxypropyl (meth)acrylate, acrylamide, methacrylamide, diacetoneacrylamide and methylenebisacrylamide are, in particular, preferably used. In view of the film forming ability of a coating layer obtained by using a polymer emulsion of the present invention, it is preferable to use an anionic group containing monomer such as a carboxyl group containing monomer, for example, acrylic acid, methacrylic acid, itaconic acid, fumaric acid, maleic acid, crotonic acid, butenetricarboxylic acid, monoethyl maleate, monomethyl maleate, monoethyl itaconate and monomethyl itaconate; and a sulfonic acid group containing monomer such as 2-acrylamide-2-methylpropanesulfonic acid, styrenesulfonic acid, vinylsulfonic acid and (meth)acrylsulfonic acid, and, in particular, use of a carboxyl group containing monomer such as acrylic acid, methacrylic acid, itaconic acid, fumaric acid and maleic acid is preferable.

The copolymerization ratio of the main monomer (M) to the sub-monomer (N) can be determined within a range providing a temperature responsibility that hydrophilicity and lipophilicity of the resultant copolymer compound changes reversibly at a certain temperature as a boundary. Namely, too high a ratio of the sub-monomer (N) does not provide said temperature responsibility to the resultant copolymer compound is Although the copolymerization ratio of the main monomer (M) and the sub-monomer (N) depends on a combination of monomer types used, the ratio of the sub-monomer (N) in a polymer compound formed is preferably not higher than 50% by weight and more preferably not higher than 30% by weight. The ratio is preferably at least 0.01% by weight to obtain better expression of the addition effect of the sub-monomer (N).

"Temperature-sensitive point" of a polymer compound (A) in the present invention means a temperature at which hydrophilicity and lipophilicity thereof change, and "temperature responsibility" means a property expressing said change between hydrophilicity and lipophilicity. In the present invention, "hydrophilicity" means a property that in a polymer compound (A)/water system, the polymer compound (A) is more stable in a compatible state with water than in a phase-separated state, whereas "lipophilicity" means a property that in a polymer compound (A)/water system, the polymer compound (A) is more stable in a phase-separated state than in a compatible state with water.

The change between hydrophilicity and lipophilicity is observed, for example, as an abrupt change in viscosity with temperature change of the polymer compound (A)/water system, an abrupt change in transparency of the polymer compound (A)/water system or by an abrupt change in solubility of the polymer compound (A) to water. Namely, the temperature-sensitive point of the polymer compound (A) can be determined as a transition point showing an abrupt change in the temperature-viscosity curve obtained by a viscosity measurement when the temperature of the polymer compound (A)/water system is gradually lowered from a region at which the polymer compound (A) shows lipophilicity, or as a temperature at which a water dispersion of the polymer compound (A) becomes transparent or starts to form a gel, when said dispersion liquid of the polymer compound (A) obtained in a temperature region at which the polymer compound (A) shows lipophilicity (a temperature above the temperature-sensitive point), is gradually cooled.

The polymer emulsion of the present invention has a temperature (temperature-sensitive point) at which an abrupt change in viscosity occurs by an effect of the change between hydrophilicity and lipophilicity with a temperature change of the polymer compound (A) contained. Namely, the temperature-sensitive point of the polymer compound (A) can be determined as a transition point showing an abrupt change in a temperature-viscosity curve obtained by a viscosity measurement when the temperature of the polymer compound (A)/water system is gradually lowered from a region (a temperature above the temperature-sensitive point) at which the polymer compound (A) shows lipophilicity, or as a temperature at which said polymer emulsion becomes transparent or starts to form a gel, when temperature of polymer emulsion of the present invention is gradually lowered from a temperature region (a temperature above the temperature-sensitive point) at which a polymer compound (A) contained in said polymer emulsion shows lipophilicity.

When the polymer emulsion of the present invention is used in manufacturing an ink jet recording medium, it is frequently preferable to employ an ink containing an anionic group containing dye. This is due to the higher light stability of such dyes than that of cationic group containing dyes. It is therefore preferable to add a cationic compound such as a cationic polymer and a cationic particle, for fixing said anionic group containing dye to a recording medium. It is more preferable, in view of ease in preparing said coating liquid, that the polymer compound (A) is cationic or nonionic. Cationic polymer compound (A) can be obtained by incorporating an unsaturated ethylenic monomer with a cationic group as a sub-monomer (N) used in polymerization, and in this respect, it is preferable to use at least one type of unsaturated ethylenic monomer with a cationic group as a sub-monomer (N). Said unsaturated ethylenic monomer with a cationic group may be used alone or in combination of two or more types. It is more preferable that said unsaturated ethylenic monomer with a cationic group contains a tertiary amino group and/or a quaternary ammonium salt group, in particular, in view of degree of color fading resulting when a print on a recording medium obtained by using an ink jet printer is exposed to sunlight or fluorescent light, and the colloid stability of the polymer emulsion obtained.

Polymer compound (A) containing a tertiary amino group and/or a quaternary ammonium salt group can be obtained, for example, by copolymerizing a main monomer (M) and a monomer containing a tertiary amino group and/or a quaternary ammonium salt group as a sub-monomer (N). Each of the main monomer (M) and the sub-monomer (N) (including a monomer containing a tertiary amino group and/or a quaternary ammonium salt group) may be used alone or in combination of two or more types.

Any monomer containing a tertiary amino group or a quaternary ammonium salt group may be used without particular limitation as long as it has a structure containing a tertiary amino group or a quaternary ammonium salt group, and it includes (2-(vinyloxy) ethyl)trimethylammonium chloride, 2,3-dimethyl-1-vinylimidazolinium chloride, trimethyl-(3-(meth)acrylamide-3,3-dimethylpropyl)-ammonium chloride, trimethyl-(3-methacrylamidepropyl)ammonium chloride, trimethyl-(3-acrylamidepropyl)ammonium chloride, N-(1,1-dimethyl-3-dimethylaminopropyl)(meth)acrylamide and a tertiary ammonium salt thereof, trimethyl-(3-(meth)acrylamide)ammonium chloride, 1-vinyl-2-methylimidazole, 1-vinyl-2-ethylimidazole, 1-vinyl-2-phenylimidazole, 1-vinyl-2,4,5-trimethylimidazole, N,N-dimethylaminopropyl (meth)acrylate and a quaternary ammonium salt thereof, N,N-dimethylaminoethyl (meth) acrylate and a quaternary ammonium salt thereof, N,N-diethylaminoethyl (meth)acrylate and a quaternary ammonium salt thereof, t-butylaminoethyl (meth)acrylate and a quaternary ammonium salt thereof, N-(3-dimethylaminopropyl)methacrylamide and a quaternary ammonium salt thereof, N-(3-dimethylaminopropyl)-acrylamide and a quaternary ammonium salt thereof, N-(3-diethylaminopropyl) methacrylamide and a quaternary ammonium salt thereof, N-(3-diethylaminopropyl)-acrylamide and a quaternary ammonium salt thereof, o-,m-,p-aminostyrene and a quaternary ammonium salt thereof, o-,m-,p-vinylbenzylamine and a quaternary ammonium salt thereof, N-(vinylbenzyl)pyrrolidone, N-(vinylbenzyl)piperidine, N-vinylimidazole and a quaternary ammonium salt thereof, 2-methyl-1-vinylimidazole and a quaternary ammonium salt thereof, N-vinylpyrrolidone and a quaternary ammonium salt thereof, N,N'-divinylethyleneurea and a quaternary ammonium salt thereof, α- or β-vinylpyridine and a quaternary ammonium salt thereof, α- or β-vinylpiperidine and a quaternary ammonium salt thereof and 2- or 4-vinylquinoline and a quaternary ammonium salt thereof. In particular, N,N-dimethylaminopropyl methacrylate, N,N-dimethylaminoethyl methacrylate and a quaternary methylchloride compound of N,N-dimethylaminopropyl (meth)acrylamide are preferably used.

The copolymerization ratio of the main monomer (M) to the sub-monomer (N) including a monomer with a tertiary amino group and/or a quaternary ammonium salt group can be determined within a range providing a temperature responsibility that hydrophilicity and lipophilicity of a copolymer compound obtained changes reversibly at a temperature-sensitive point as a boundary.

The content of monomer units containing tertiary amino groups and/or a quaternary ammonium salt groups in a polymer compound (A) used in the present invention is not particularly limited as long as it is in the above-described conditional range, but the content is preferably not lower than 0.01% by weight from the viewpoint of ease in preparing a coating liquid. It is not higher than 50% by weight, and more preferably 0.1–30% by weight, from the viewpoint of film forming ability.

Further, it is more preferable to use a monomer containing a quaternary ammonium salt group than a monomer containing a tertiary amino group in view of degree of color fading resulted when a print is exposed to sunlight or fluorescent light.

Still further, it is preferable to contain both a monomer containing a tertiary amino group and/or a quaternary ammonium salt group and a monomer containing the above-described anionic group, in view of both ease in preparing a coating liquid described above and the film forming ability of a coating layer obtained by using a polymer emulsion of the present invention. In particular, the use of a monomer containing a carboxylic acid group such as acrylic acid, methacrylic acid, itaconic acid, fumaric acid and maleic acid as said monomer containing an anionic group, is preferable.

The glass transition point of a polymer compound (A) used in the present invention is not particularly limited, but −50 to +150° C. is preferable in view of film forming ability and flexibility of the recording medium obtained, and −50 to +30° C. is generally preferable in view of providing flexibility to a recording medium obtained. However, when a polymer emulsion of the present invention is used in manufacturing an ink jet recording medium, the glass transition point is preferably 30 to 130° C. when ink absorption of an ink jet recording medium obtained is important, whereas −50 to +30° C. is preferable when flexibility of the ink jet recording medium obtained and the transparency of the ink absorption layer are important. Furthermore, when a polymer emulsion of the present invention is used in manufacturing a thermal recording medium, the glass transition point is preferably 80 to 150° C. in view of melt fusion to a thermal recording head.

The temperature-sensitive point of the polymer compound (A) used in the present invention is not particularly limited, but it is preferably 5 to 100° C., more preferably 5 to 50° C., and most preferably 10 to 40° C., in view of an easiness in coating operation and film forming ability.

The present invention also provides a method for manufacturing a polymer emulsion in accordance with inventions 11)–15).

In manufacturing a polymer emulsion of the present invention, it is preferable to perform a polymerization reaction in a temperature region above the temperature-sensitive point of a polymer compound (A). Since a polymer compound (A) shows lipophilicity in said temperature region and forms an emulsion. A polymer emulsion of the present invention can be obtained in said temperature region by using widely known manufacturing technology for polymer emulsions. In more detail, the technology includes a method for emulsion polymerization by dissolving a surfactant in water, adding and emulsifying copolymerization components such as the above-described main monomer (M) and a sub-monomer (N) and adding a free radical initiator to perform a reaction under batch-wise addition, and a method of a continuous drop-wise addition or a method of serial addition of the above-described copolymerization components and a free radical initiator to a reaction system.

In manufacturing polymer emulsion containing a polymer compound (A) used in the present invention, use of a surfactant is preferable.

Polymer emulsions of the present invention may be any of anionic, cationic, nonionic and ampho-ionic type.

When polymer emulsions containing a polymer compound (A) are anionic, an anionic surfactant and/or a nonionic surfactant are used. For example, an anionic surfactant includes fatty acid soap, alkylsulfonate salt, alkylsulfosuccinate salt, polyoxyethylene alkylsulfate salt, polyoxyethylene alkylarylsulfate salt, p-styrenesulfonate salt, alkylnaphthalenesulfonate salt, naphthalenesulfonate salt, formalin polycondensates, condensates of higher fatty acids and amino acids, dialkyl sulfosuccinate, naphthenate, alkylether calboxylate, acylated peptide, α-olefin sulfonate salt, N-acylmethyltaurine, alkyl ether sulfate salt, secondary higher alcohol ethoxysulfate, polyoxyethylene alkyl phenyl ether sulfate, monoglysulfate salt, alkyl ether phosphate and alkyl phosphate. Nonionic surfactants include polyoxyethylene alkylaryl ether, polyoxyethylene alkylphenyl ether, polyoxyethylene sorbitan fatty acid ester, oxyethylene-oxypropylene blockcopolymer and polyglycerin fatty acid ester.

When polymer emulsions containing a polymer compound (A) are cationic, a cationic surfactant and/or a nonionic surfactant are used. For example, a cationic surfactant includes laurylamine hydrochloride, alkylbenzyldimethylammoniumchloride, lauryltrimethylammoniumchloride, alkylammoniumhydroxide and polyoxyethylene alkylamine. A nonionic surfactant includes polyoxyethylene alkylaryl ether, polyoxyethylene alkylphenyl ether, polyoxyethylene sorbitan fatty acid ester, oxyethylene-oxypropylene blockcopolymer and polyglycerin fatty acid ester.

When polymer emulsions containing a polymer compound (A) is nonionic, a nonionic surfactant is used. Nonionic surfactant include polyoxyethylene alkylaryl ether, polyoxyethylene alkylphenyl ether, polyoxyethylene sorbitan fatty acid ester, oxyethylene -oxypropylene blockcopolymer and polyglycerin fatty acid ester.

An ampho-ionic surfactant includes carboxybetaine type, aminocarboxylate salt and lecithin.

When polymer emulsions containing a polymer compound (A) is ampho-ionic, it is preferable to use an ampho-ionic surfactant in view of stability of the polymer emulsion against pH change. However, when said polymer emulsion shows cationic properties in a coating liquid of the present invention, a cationic surfactant can be used, whereas, when said polymer emulsion shows anionic properties in a coating liquid of the present invention, an anionic surfactant can be used. An ampho-ionic surfactant includes carboxybetaine type, aminocarboxylate salt and lecithin.

The amount of these surfactants to be used is preferably 0.05–50 parts by weight, and more preferably 1–30 parts by weight based on 100 parts by weight of solid resin component of a polymer emulsion containing a polymer compound (A).

In the present invention, the above-described surfactant may be used alone or in combination of two or more types.

In polymerization of a polymer emulsion containing a polymer compound (A) of the present invention, it is preferable to reduce the amount of a non-reactive surfactant to be used by using a "surfactant with a reactive group" in view of the water resistance of the printed image on a recording medium obtained. A surfactant with a reactive group is generally called a reactive surfactant and includes a compound with a lipophilic, hydrophilic or reactive group in a molecule. Said reactive group includes, for example, a functional group with a carbon-carbon double bond such as (meth)acryl group, 1-propenyl group, 2-methyl-1-propenyl group, isopropenyl group, vinyl group and (meth)acryloyl group.

An anionic reactive surfactant is one which includes a surfactant having a structure of sulfonate group, sulfate group, carboxylate group, phosphate group, or vinyl monomer with a sulfonate group. Such vinyl monomers include those obtained by neutralizing various vinyl monomers having a sulfonic acid group such as allylsulfonic acid, 2-methylallylsulfonic acid, vinylsulfonic acid, 4-vinylbenzenesulfonic acid, 2-(meth)acryloyloxyethanesulfonic acid, 2-(meth)acryloyloxypropanesulfonic acid and 2-acrylamide-2-methylpropanesulfonic acid with various basic compounds. Said basic compounds include lithium hydroxide, sodium hydroxide, potassium hydroxide, ammonia, methylamine, ethylamine, n-butylamine, dimethylamine, diethylamine, trimethylamine, triethylamine, tri-n-butylamine, diethanolamine, 2-dimethylaminoethyl alcohol, tetramethylammoniumhydoxide and tetra-n-butylammoniumhydoxide. Vinyl monomers with sulfate groups include, for example, monomers obtained by neutralizing various vinyl monomers with a sulfate group such as sulfuric acid ester of allyl alcohol with the above-described various basic compounds. Vinyl monomers with a phosphate group includes, for example, monomers obtained by neutralizing various vinyl monomers with a phosphoric acid group such as mono [2-(meth)acryloyloxyethyl]acid phosphate with the above-described various basic compounds. An anionic reactive surfactant with an allyl group ($CH_2$═C(—R)—$CH_2$—), wherein R is alkyl, includes, for example, sulfate ester salt of polyoxyethylene allylglycidylnonylphenyl ether and is available as commercial products such as "Adeka reasoap SE-10N" series (trade name of a product from Asahi Denka Kogyo K.K.), "Eleminol JS-2" (trade name of a product from Sanyo Chem. Ind. Ltd.), "Latemul S-180 or S-180A" (trade name of a product from Kao Corp.) and "H3390A" and "H3390B" (trade name of a product from Dai-ich Kogyo Seiyaku Co., Ltd.). An anionic reactive surfactant with a (meth)acryloyl group ($CH_2$═C(—R)—C(═O)—O—), wherein R is alkyl, includes, for example, "Eleminol RS-30" series (trade name of products from Sanyo Chem. Ind. Ltd.) and "Antox MS-60" series (trade name of products from Nippon Nyukazai Co., Ltd.) as commercial products. An anionic reactive surfactant with a propenyl group ($CH_3$—CH═CH—) includes, for example, ammonium salt of sulfate ester of polyoxyethylene nonylpropenylphenyl ether and is available as commercial products such as "Akuaron (Hitenol) HS-10" series and "Akuaron (Hitenol) BC" series (trade name of products from Dai-ich Kogyo Seiyaku Co., Ltd.). Cationic reactive surfactants include cationic vinyl monomers with a cationic amine salt group. Vinyl monomers with an amine salt group include, for example, monomers obtained by neutralizing vinyl monomers with an amine group such as allylamine, N,N-dimethylallylamine, N,N-diethylallylamine and 3-(diethylamino)propyl vinyl ether, with various acidic compounds. Said acidic compounds include hydrochloric acid, formic acid, acetic acid and lauric acid. Cationic reactive surfactants are available as commercial products such as "RF-751" (trade name of a product from Nippon Nyukazai Co., Ltd.) and "Blemer QA" (trade name of a product from NOF COPR.).

Nonionic reactive surfactants include, for example, vinyl ethers having various polyether side chains such as polyoxyethylene alkyl ether, polyoxyethylene alkylphenyl ether, polyoxyethylene higher fatty acid ester and polyoxyethylene-polyoxypropylene blockcopolymers; and monomers such as allyl ethers and (meth)acrylate esters. Nonionic reactive surfactants with an allyl group ($CH_2$═C(—R)—$CH_2$—), wherein R is alkyl, include, for example, polyoxyethylene allylglycidylnonylphenyl ether and is available as commercial products such as "Adeka reasoap NE" series (trade name of a product from Asahi Denka Kogyo K.K.). Nonionic reactive surfactants with a (meth)acryloyl group ($CH_2$═C(—R)—C(═O)—O—), wherein R is alkyl, include, as commercial products such as "RMA-560" series (trade name of products from Nippon Nyukazai Co., Ltd.) and "Blemer PE" series (trade name of products from NOF COPR.). Nonionic reactive surfactants with a propenyl group ($CH_3$—CH═CH—) include, for example, polyoxyethylene nonylpropenylphenyl ether and available as commercial products such as "Akuaron (Hitenol) RN" series (trade name of products from Dai-ich Kogyo Seiyaku Co., Ltd.).

The amount of the reactive surfactant to be used is preferably 0.05–100 parts by weight, and more preferably 1–50 parts by weight based on 100 parts by weight of a solid resin component of polymer emulsion containing a polymer compound (A).

In the present invention, the above-described reactive surfactant may be used alone or in combination of two or more types, and also in combination with a surfactant without the above-described reactivity.

When the polymer emulsion of the present invention is used in manufacturing an ink jet recording medium, it is preferable to use a dye containing ink with an anionic group. This is because of its higher light stability than dyes with a cationic group in many cases. It is therefore preferable to add a cationic compound such as a cationic polymer and a cationic particle to a coating liquid for an ink jet recording medium, for fixing said dye containing anionic group. It is more preferable to use a cationic surfactant or a nonionic surfactant in a polymer emulsion containing a polymer compound (A), in view of ease in preparing said coating liquid. In particular, when particles, mainly composed of silica (silicon oxide) such as fumed silica, are used in a coating liquid as fine particles (C) described later, it is preferable that the polymer emulsion contain a polymer compound (A) which contains a cationic surfactant, in view of ease in preparing said coating liquid. The reason for this is not clear, but it is known that a polymer emulsion of the present invention containing only a nonionic surfactant tends to exhibit coagulation of fine particles composed mainly of silica. This makes the preparation of coating liquid difficult, whereas incorporation of a cationic surfactant inhibits coagulation.

The average particle diameter of the polymer emulsion particles of the present invention is not particularly limited, but is preferably 10–200 nm, more preferably 10–100 nm, in view of film forming ability of a coating layer and manufacturing efficiency of the polymer emulsion.

When polymer emulsions of the present invention are used in manufacturing an ink jet recording medium, in particular, said average particle diameter is preferably not larger than 100 nm, in view of transparency and color expression of a coating layer. The average particle diameter herein is a number average particle diameter of a polymer emulsion as measured by a dynamic light scattering method in a temperature region at which a polymer compound (A) shows lipophilicity.

In a coating liquid before application, it is preferable to contain particles composed of a core consisting of a particle (B) and a coating containing a polymer compound (A) located around said core, in view of film forming ability. A particle (B) consisting of a core may be either an organic polymer compound or inorganic fine particles, but an organic polymer compound is preferable in view of flexibility of the coating layer finally obtained. Inorganic fine particles are preferable in view of larger void volume and ink absorption of the coating film finally obtained. "Around a core" herein means a peripheral part that moves in a medium together with the core.

The polymer emulsion formed with the core composed of a particle (B) and a coating containing a polymer compound (A) located around said core can be manufactured by either synthesizing a particle (B) forming a core in a reaction of the first step, or by feeding a particle (B) forming the core, prepared separately, to a reaction system, followed by a reaction similar to the above-described synthesis method for a polymer emulsion containing a polymer compound (A). A particle (B) in the present invention may be any of anionic, cationic, nonionic or ampho-ionic types, but in polymerization of a polymer emulsion containing said polymer compound (A) in a coating, it is preferable that a particle (B) is cationic in view of polymerization stability, because it is more preferable that a polymer compound (A) is cationic as described above.

The ratio of a core composed of a particle (B) and coating containing a polymer compound (A) located around said core (core/coating ratio by weight) is not particularly limited, but it is preferably in a range from 1/10 to 10/1, in view of film forming ability, coating film strength and ink absorption of a coating layer obtained.

When particle (B) is an organic polymer compound, it includes, for example, conventional known copolymers and three-dimensionally cross-linked resins obtained by free radical polymerization, anionic polymerization and cationic polymerization in an aqueous medium, such as poly(meth) acrylate, poly(vinyl acetate), poly(vinyl acetate-acrylate), poly(ethylenevinyl acetate), silicone, polybutadiene, poly (styrene-butadiene), NBR, polyvinyl chloride, chlorinated polypropylene, polyethylene, polystyrene, polyvinylidene chloride, poly[styrene-(meth)acrylate], poly(styrene-maleic anhydride), along with modified copolymers such as silicone modified acrylics, fluorine-modified acrylics, acrylsilicon and epoxy-acrylics. A particle (B) may contain one type or two or more types of these copolymers. "(Meth)acryl" herein is a simplified description of methacryl or acryl. In particular, an organic polymer compound, classified into poly(meth)acrylate (an acrylic polymer compound) and/or poly[styrene-(meth)acrylate] (a styrene-acrylate polymer compound), is preferably used in view of transparency or light yellowing resistance of a coating layer finally obtained and storage stability of recording medium obtained.

Particle (B), when it is an organic polymer compound, is preferably obtained as a polymer emulsion, and is obtained by using well known manufacturing technology for polymer emulsion. In more detail, the technology includes a method for emulsion polymerization by dissolving a surfactant in an aqueous solvent, adding and emulsifying monomer components as described later, and adding a radical initiator to perform a reaction under batch-wise addition, and a method of a continuous drop-wise addition or a method of serial addition of the above-described copolymerization components and a free radical initiator to the reaction system.

As a monomer (monomer (L)) to obtain a particle (B), when it is an organic polymer compound, one type or two or more types of unsaturated ethylenic monomers may be used in combination. The monomers typically include (meth) acrylate ester, (meth)acrylamide monomer and vinyl cyanide. Examples of (meth)acrylate ester include alkyl (meth) acrylate having an alkyl group with 1–18 carbon atoms, hydroxyalkyl (meth)acrylate having an alkyl group with 1–18 carbon atoms, (poly)oxyetylene (meth)acrylate having 1–100 ethyleneoxide units, (poly)oxypropylene (meth)acrylate having 1–100 propyleneoxide units and (poly)oxyethylene di(meth)acrylate having 1–100 ethyleneoxide units. Typical examples of alkyl(meth)acrylate having an alkyl group with 1–18 carbon atoms include methyl (meth)acrylate, ethyl (meth)acrylate, n-butyl (meth)acrylate, 2-ethylhexyl (meth)acrylate, cyclohexyl (meth)acrylate, methylcyclohexyl (meth)acrylate and dodecyl (meth)acrylate. Typical examples of hydroxyalkyl (meth)acrylate having a hydroxyalkyl group with 1–18 carbon atoms include 2-hydroxyethyl (meth)acrylate, 2-hydroxypropyl (meth)acrylate, 2-hydroxycyclohexyl (meth)acrylate and 2-hydroxydodecyl (meth)acrylate. Typical examples of (poly)oxyethylene (meth)acrylate having 1–100 ethyleneoxide units include ethyleneglycol (meth)acrylate, ethyleneglycol methoxy (meth)acrylate, diethyleneglycol (meth)acrylate, diethyleneglycol methoxy(meth)acrylate, tetraethyleneglycol (meth)acrylate and tetraethyleneglycol methoxy(meth)acrylate. Typical examples of (poly)oxypropylene (meth)acrylate having 1–100 propyleneoxide units include propyleneglycol (meth)acrylate, propyleneglycol 3-methoxy(meth) acrylate, dipropyleneglycol (meth)acrylate, dipropyleneglycol methoxy(meth)acrylate, tetrapropyleneglycol (meth)acrylate and tetrapropyleneglycol methoxy (meth)acrylate. Typical examples of (poly)oxyethylene di(meth)acrylate having 1–100 ethyleneoxide units include ethyleneglycol di(meth)acrylate, diethyleneglycol di(meth) acrylate, diethyleneglycol methoxy(meth)acrylate, and tetraethyleneglycol di(meth)acrylate. Typical examples of (meth)acrylamide monomer include, for example, (meth) acrylamide, N-methylol(meth)acrylamide, N-butoxymethyl (meth)acrylamide and diacetoneacrylamide. Typical examples of vinyl cyanide include, for example (meth) acrylonitrile. Typical examples of monomers other than the above-described monomer includes olefins such as ethylene, propylene and isobutylene; dienes such as butadiene; halogenated olefins such as vinyl chloride and vinylidene chloride; vinyl carboxylates such as vinyl acetate, vinyl propionate, vinyl n-butylate, vinyl benzoate, vinyl p-t-butylbenzoate, vinyl pivalate, vinyl 2-ethylhexanoate, vinyl versatate and vinyl laurate; isopropenyl carboxylates such as isopropenyl acetate and isopropenyl propionate; vinyl ethers such as ethyl vinyl ether, isobutyl vinyl ether and cyclohexyl vinyl ether; styrene derivatives such as styrene and methylstyrene; aromatic vinyl compounds such as vinyltoluene; allyl esters such as allyl acetate and allyl benzoate; allyl ethers such as allyl ethyl ether, allyl glycidyl ether and allyl phenyl ether; further, γ-(meth)acryloxypropyltrimethoxysilane, vinylmethyldiethoxysilane, vinylmethyldimethoxysilane, vinyldiethylethoxysilane, vinyldimethylmethoxysilane, vinyltrimethoxysilane, vinyltriethoxysilane, 4-(meth) acryloyloxy-2,2,6,6-tetramethylpiperridine, 4-(meth) acryloyloxy-1,2,2,6,6-pentamethylpiperridine, perfluoromethyl (meth)acrylate, perfluoropropyl (meth) acrylate, perfluoropropylomethyl (meth)acrylate, vinylpyrrolidone, trimethylolpropane tri(meth)acrylate, glycidyl (meth)acrylate, 2,3-cyclohexeneoxide (meth)acrylate, allyl methacrylate, 2-(phosphonoxyl)ethyl (meth)acrylate, 3-chloro-2-acidphosphoxypropyl methacrylate, methylpropanesulfonic acid acrylamide and divinylbenzene; monomers containing a carboxylic acid group such as acrylic acid, methacrylic acid, itaconic acid, fumaric acid, maleic acid, crotonic acid, butenetricarboxylic acid, monoethyl maleate, monomethyl maleate, monoethyl itaconate and monomethyl itaconate; monomers containing a sulfonic acid group such as 2-acrylamide-2-methylpropanesulfonic acid, styrenesulfonic acid, vinyl sulfonic acid and (meth)acrylsulfonic acid; and monomers containing an amino group such as N,N-dimethylaminoethyl (meth)acrylate and N,N-diethylaminoethyl (meth)acrylate. (Meth)acryl here is a simplified designation of methacryl and acryl.

It is preferable, in view of film forming ability of a coating layer obtained by using polymer emulsion of the present invention, to use a monomer containing an anionic group such as monomers containing a carboxylic acid group, for example, acrylic acid, methacrylic acid, itaconic acid, fumaric acid, maleic acid, crotonic acid, butenetricarboxylic acid, monoethyl maleate, monomethyl maleate, monoethyl itaconate and monomethyl itaconate; and monomers containing a sulfonic acid group such as 2-acrylamide-2-methylpropanesulfonic acid, styrenesulfonic acid vinyl sulfonic acid and (meth)acrylsulfonic acid, and in particular, monomers containing a carboxylic acid group such as acrylic acid, methacrylic acid, itaconic acid, fumaric acid and maleic acid.

The glass transition point of particle (B), when it is an organic polymer compound, is not particularly limited, but −50 to +150° C. is preferable in view of film forming ability and −50 to +30° C. is generally preferable in view of flexibility provided to a recording medium obtained. However, when a polymer emulsion of the present invention is used in manufacturing an ink jet recording medium, the glass transition point is preferably 30–130° C. when ink absorption of an ink jet recording medium is important, whereas −50 to +30° C. is preferable when flexibility of an ink jet recording medium obtained and transparency of an ink absorption layer are important.

The number average particle diameter of particle (B), when it is an organic polymer compound, is not particularly limited, but is preferably 3–150 nm, more preferably 10–100 nm, in view of the film forming ability of the coating layer and manufacturing efficiency of the polymer emulsion. However, when the polymer emulsion of the present invention is used in manufacturing an ink jet recording medium, said average particle diameter is preferably 3–100 nm, more preferably 5–70 nm and most preferably 10–50 nm, in view of transparency and color expression of the coating layer and manufacturing efficiency of the polymer emulsion. "Number average particle diameter" herein is a value as measured by a dynamic light scattering method.

Particle (B) forming the core, when it is an inorganic fine particle, includes, for example, light calcium carbonate, heavy calcium carbonate, magnesium carbonate, kaolin, clay, talc, calcium sulfate, barium sulfate, titan dioxide, zinc oxide, zinc hydroxide, zinc sulfide, zinc carbonate, hydrotalcite, aluminum silicate, diatomite, calcium silicate, magnesium silicate, synthetic amorphous silica, colloidal silica, fumed silica, alumina, colloidal alumina, psuedo-boehmite type alumina, aluminium hydroxide, zeolite, magnesium hydroxide, along with oxides of metals such as zirconium, titanium, tantalum, niobium, tin and tungsten; and phosphates of metals such as aluminium, vanadium, zirconium and tungsten; inorganic particles in which a part of the inorganic substance is substituted by other elements; and inorganic particles with surface modified by organic materials. These inorganic fine particles may be used alone or in combination of two or more types. In particular, colloidal silica and fumed silica are preferably used as a particle (B). Use of colloidal silica or fumed silica is preferable because of high image quality in printing on a recording medium obtained. The type of colloidal silica is not particularly limited. Common anionic colloidal silica and cationic silica obtained by reaction of a polyvalent metal compound such as aluminium ion are suitable. The type of dry silica is not particularly limited, but silica obtained by a vapor phase method that is synthesized by combustion of silicon tetrachloride with hydrogen and oxygen, is preferably used. Dry silica may be used as it is or after surface modification with a silane coupling agent and the like.

When polymer emulsions of the present invention are used in manufacturing an ink jet recording medium, it is preferable to use alumina sol and psuedo-boehmite type of alumina fine particles as a particle (B). Use of alumina sol and psuedo-boehmite type of alumina fine particles can easily provide a cationic copolymer emulsion and contributes to improved image quality in printing on an ink jet recording medium, and provides water resistance to the printed image.

Particle (B), forming the core, may be used as a primary particle as it is or in a state forming a secondary particle. Any diameter of particle (B), forming a core part, can be employed, but preferably a number average particle diameter of not larger than 10 μm, more preferably not larger than 1 μm, and further more preferably not larger than 200 nm is used to obtain a recording medium with a smooth surface. Furthermore, when an emulsion of the present invention is used in manufacturing an ink jet recording medium, a particle (B) forming a core part with number average primary particle diameter of preferably not larger than 100 nm, more preferably not larger than 50 nm is used to increase optical density (color density) of printed part after printing, as well as to obtain gloss similar to silver halide photograph. Lower limit of diameter of particle (B), forming the core, is not particularly limited, but a number average particle diameter of not smaller than about 3 nm is desirable in view of productivity.

Polymer emulsions of the present invention may contain a polymer compound (D), which shows no change between hydrophilicity and lipophilicity depending on a change of solvent temperature. Polymer compound (D) can be obtained, for example, by polymerizing one or more types of a monomer (L) to prepare a particle (B), when it is the above-described sub-monomer (N) or an organic polymer compound. Furthermore, one or more types of main monomer (M) can be contained within a composition range in which no change between hydrophilicity and lipophilicity occurs depending on a change of solvent temperature. Whether a polymer compound (D) obtained shows a change between hydrophilicity and lipophilicity or not can be confirmed by visual examination of a change in transparency, gelling or turbidity of said liquid when temperature of said polymer compound (D) in water is gradually changed. When a polymer compound (D) is obtained by copolymerizing a sub-monomer (N) and a main monomer (M), copolymerization ratio of a sub-monomer (N) and a main monomer (M) depends on a combination of monomers used, but a ratio of a main monomer (M) is preferably not higher than 50% by weight, more preferably not higher than 30% by weight. Polymer compound (D) can be contained in a polymer emulsion using a similar polymerization method for particle (B) composed of a polymer compound (A) or an organic polymer. Polymer compound (D) may be either hydrophilic or lipophilic. A polymer emulsion containing a hydrophilic polymer compound (D) used in manufacturing a recording medium provides a good film forming ability, and thus preferable. A polymer emulsion containing a lipophilic polymer compound (D) used in manufacturing a recording medium provides a coating liquid with higher solid concentration but with low viscosity, resulting in a more efficient and economical drying of a coating layer, and is therefore preferable. Preferable monomers used to obtain polymer compounds (D) includes 2-hydroxyethyl (meth)acrylate, 2-hydroxypropyl (meth)acrylate, (meth)acrylamide, diacetoneacrylamide, acrylic acid, methacrylic acid, itaconic acid, fumaric acid, maleic acid, crotonic acid, butenetricarboxylic acid, monoethyl maleate, monomethyl maleate, monoethyl itaconate, 2-acrylamide-2-methylpropanesulfonic acid, styrenesulfonic acid, (meth)acrylsulfonic acid, vinylsulfonic acid, methyl (meth)acrylate, n-butyl (meth) acrylate, 2-ethylhexyl (meth)acrylate and styrene. Furthermore, in view of film forming ability of a coating layer obtained by using the polymer emulsion of the present invention, it is preferable to use a monomer containing a carboxylic acid group such as acrylic acid, methacrylic acid, itaconic acid, fumaric acid, maleic acid, crotonic acid, butenetricarboxylic acid, monoethyl maleate, monomethyl maleate, monoethyl itaconate and monomethyl itaconate; monomers containing a sulfonic acid group such as 2-acrylamide-2-methylpropanesulfonic acid, styrenesulfonic acid, vinylsulfonic acid and (meth)acrylsulfonic acid. In particular, it is preferable to use a monomer containing a carboxylic acid group such as acrylic acid, methacrylic acid, itaconic acid, fumaric acid and maleic acid.

When polymer emulsions of the present invention are used in manufacturing an ink jet recording medium, it is preferable to add a cationic compound such as a cationic polymer and a cationic particle in a coating liquid for an ink jet recording medium, for fixing any anionic group in the dye or ink. It is preferable, in view of ease of preparing said coating liquid, that a polymer compound (D) is cationic or nonionic. Cationic polymer compounds (D) can be obtained, for example, by incorporating an unsaturated ethylenic monomer with a cationic group as a part of sub-monomers (N) used in polymerization. Said unsaturated ethylenic monomer with a cationic group may be used alone or in combination of two or more types. In particular, it is preferable that said unsaturated ethylenic monomer with a cationic group contains a tertiary amino group and/or a quaternary ammonium salt group, in view of the degree of color fading resulting when printed matter on a recording medium obtained by using an ink jet printer is exposed to sunlight or fluorescent light, and the colloid stability of the resultant polymer emulsion.

Preferable examples of a monomer containing a tertiary amino group and/or a quaternary ammonium salt group are similar to those for polymer compound (A).

In view of the above-described ease in preparing the coating liquid and the film forming ability of the coating layer obtained by using a polymer emulsion of the present invention, it is preferable it contains both a monomer containing a tertiary amino group and/or a quaternary ammonium salt group and a monomer containing the above-described anion group. In particular, it is preferable to use a monomer containing a carboxylic acid group such as acrylic acid, methacrylic acid, itaconic acid, fumaric acid and maleic acid as said monomer containing an anion group.

The glass transition point of the polymer compound (D) used in the present invention is not particularly limited, but −50 to +150° C. is preferable in view of the film forming ability and flexibility of the recording medium obtained; and −50 to +30° C. is generally preferable in view of the flexibility provided to a recording medium obtained. However, when a polymer emulsion of the present invention is used in manufacturing an ink jet recording medium, the glass transition point is preferably 30–130° C. when ink absorption of an ink jet recording medium is important, whereas −50 to +30° C. is preferable when the flexibility of an ink jet recording medium obtained and transparency of an ink absorption layer are important. Furthermore, when a polymer emulsion of the present invention is used in manufacturing a thermal recording medium, the glass transition point is preferably 80 to 150° C. in view of melt fusion to a thermal recording head.

The content of polymer compound (D) in solid components of a polymer emulsion of the present invention is not particularly limited, but it is preferably not higher than 70% by weight and more preferably not higher than 40% by weight in view of the expression of an effect of viscosity change generated by a change between hydrophilicity and lipophilicity in the polymer compound (A).

In the polymerization of a polymer compound (A), it is preferable to polymerize in the presence of polyvinyl alcohol or a polyvinyl alcohol derivative, in view of the forming ability of the coating layer of the recording medium finally obtained and the strength of a film formed.

The polyvinyl alcohol and/or the polyvinyl alcohol derivative used in the present invention is not particularly limited, but includes that generally referred to as the completely saponified type with a saponification value of 96–100%; that generally referred to as the partially saponified type with a saponification value of 76–95% as polyvinyl alcohol; polyvinyl alcohol modified with silanol; cationically modified polyvinyl alcohol; polyvinyl alcohol with a mercapto group; and polyvinyl alcohol with a keto group as a polyvinyl alcohol derivative. Polyvinyl alcohol or a polyvinyl alcohol derivatives may be used alone or in combination of two or more types. Degree of polymerization of said polyvinyl alcohol or a polyvinyl alcohol derivative is not particularly limited, but 300–4,000 is preferable.

The ratio of main monomer (M), sub-monomer (N), polyvinyl alcohol and/or a polyvinyl alcohol derivative to be used is determined within a range in which the polymer compound (A) obtained shows temperature responsibility. The content of the polyvinyl alcohol or polyvinyl alcohol derivative in the polymer compound (A) is not particularly limited as long as it is within said condition, but it is preferably 0.1–50% by weight, and more preferably 0.5–20% by weight in view of the water resistance of the coated film of the recording medium finally obtained.

It is preferable that polymer emulsions of the present invention contain a carbonyl group in view of film strength and water resistance of the coated film of the recording medium obtained. The carbonyl group may be contained in the polymer compound (A) or in a particle (B) or also in a polymer compound (D). Polymer compound (A) containing a carbonyl group can be obtained, for example, by copolymerizing a main monomer (M) and a sub-monomer (N) containing a carbonyl group. Each of main monomer (M) and sub-monomer (N) containing a carbonyl group can be used alone or in combination of two or more types. The copolymerization ratio of main monomer (M) and sub-monomer (N) containing a carbonyl group is determined within a range in which a copolymerized compound obtained shows a temperature responsibility that is a reversible change between hydrophilicity and lipophilicity occurring critically at a temperature-sensitive point of the copolymer compound obtained as a boundary.

The content of monomer units containing a carbonyl group in polymer compound (A) is not particularly limited, but is preferably 0.01–50% by weight and more preferably 0.1–20% by weight in view of film forming ability.

When a particle (B) containing a carbonyl group is, for example, made of an organic polymer compound, said particle (B) can be obtained by copolymerizing a monomer to be used for said organic polymer compound particle (B) and a monomer containing a carbonyl group. Each of said monomers to be used for said organic polymer compound particle (B) and a monomers containing a carbonyl group can be used alone or in combination of two or more types. The content of the monomers containing a carbonyl group in a particle (B) is not particularly limited, but is preferably 0.01–50% by weight and more preferably 0.1–20% by weight in view of film forming ability.

Polymer compound (D) containing a carbonyl group is obtained by copolymerizing a monomer to obtain a polymer compound (D) and a monomer containing a carbonyl group. Each of the above-described monomers to obtain a polymer compound (D) and monomers containing a carbonyl group can be used alone or in combination of two or more types. The content of monomer units containing a carbonyl group in polymer compound (D) is not particularly limited, but is preferably 0.01–50% by weight and more preferably 0.1–20% by weight in view of film forming ability.

The type of monomers containing a carbonyl group is not particularly limited so long as it has a structure containing a keto or an aldo group in the monomer. They include acrolein, diacetoneacrylamide, diacetonemethacrylamide, formylstyrene, vinyl methyl ketone, vinyl ethyl ketone, vinyl isobutyl ketone, acryloxyalkylpropanals, methacryloxyalkylpropanals, diacetoneacrylate, diacetonemethacrylate, acetonitrile acrylate, 2-hydroxypropyl acrylate acetylacetate and butanediol acrylate acetylacetate.

When the polymer emulsion of the present invention contains a carbonyl group, it is preferable to use as a cross-linking agent a hydrazine derivative having at least two hydrazine groups and/or semicarbazide groups in the coating liquid used for manufacturing a recording medium, in view of water resistance and strength of the coated film obtained. A coating layer containing a compound having a molecular structure, in which carbonyl moieties are cross-linked with a hydrazine derivative, can be obtained by adding said hydrazine derivative in a coating liquid containing a polymer emulsion of the present invention, followed by mixing, applying and drying. The type of hydrazine derivative is not particularly limited as long as it is a compound containing at least two hydrazine groups and/or semicarbazide groups. Among those suitable, the following compounds are exemplified: carbohydrazide, isophthalic acid hydrazide, malonic acid hydrazide, succinic acid hydrazide, glutaric acid hydrazide, adipic acid hydrazide, sebacic acid hydrazide, maleic acid hydrazide, fumaric acid hydrazide, itaconic acid hydrazide, polyacrylic acid hydrazide, ethylene-1,2-dihydrazine, propylene-1,3-dihydrazine, butylene-1,4-dihydrazine and hydrated hydrazine as a compound with hydrazine groups; and a reaction product of a polyisocyanate compound and said hydrazine compound as a compound with semicarbazide groups. As said hydrazine derivative, a compound with semicarbazide groups is preferable, due to the high water resistance imparted to the recording medium obtained. The content of said hydrazine derivative is not particularly limited, but can be 0.01–10 times that of a monomer units containing a carbonyl group in a polymer emulsion obtained, in terms of molar ratio.

The temperature-sensitive point can be lowered by adding alcohols such as ethyl alcohol to the polymer emulsion of the present invention. Namely, when the temperature-sensitive point is room temperature or higher, the polymer compound (A) can be maintained in an emulsion state at around room temperature by adding alcohols. The addition of alcohols is preferable because it makes transportation of the polymer emulsion, containing the polymer compound (A), very easy and economical. The type of alcohol is not particularly limited and includes: ethyl alcohol, methyl alcohol, n-propyl alcohol, n-butyl alcohol, isopropyl alcohol, n-pentyl alcohol and n-hexyl alcohol. Methyl alcohol, ethyl alcohol and isopropyl alcohol are used preferably in view of the effect obtained. Such alcohols can be used alone or in combination of two or more types. The amount of alcohol to be added is preferably 5–200 parts by weight in general based on 100 parts by weight of water in the polymer emulsion, when ethanol is used.

The present invention also provides a coating liquid for a recording medium in accordance with the above-described inventions 16)–23).

The coating liquid of the present invention is preferably prepared and used at a temperature above the temperature-sensitive point of the polymer compound (A) or the polymer emulsion of the present invention. Namely, the coating liquid of the present invention has a relatively low viscosity at temperatures above said temperature-sensitive point, but said coating liquid abruptly becomes thick (or forms a gel) when said coating liquid is cooled down to a temperature not higher than said temperature-sensitive point. Said thickening is caused by a change between lipophilicity and hydrophilicity of a polymer compound (A). Namely, a very smooth and homogeneous coating layer, formed with a coating liquid with relatively low viscosity, can be maintained as it is, due to subsequent thickening (or gelling) by cooling down the coating liquid of the present invention to a temperature not higher than the temperature-sensitive point soon after the application to a substrate at a temperature above said temperature-sensitive point. Good surface state and homogeneity of the coating layer can be retained even after a drying process and thus a coating layer with good quality can be obtained.

The incorporation of fine particles (C) in a coating liquid of the present invention is preferable in view of the ink absorption of the recording medium obtained. Fine particle (C) may either be an organic compound or an inorganic compound.

The fine particles (C) can be of an organic compound, including: commonly known copolymers; three-dimensionally cross-linked resins and the like obtained by radical polymerization; polymers formed by anionic polymerization and cationic polymerization in aqueous medium, such as poly(meth)acrylate, polyvinyl acetate, polyvinyl acetate-acrylics, polyethylene vinyl acetate, silicone, polybutadiene, poly(styrene-butadiene), NBR, polyvinyl chloride, chlorinated polypropylene, polyethylene, polystyrene, polyvinylidene chloride, poly(styrene-(meth)acrylate), styrene and maleic anhydride; modified copolymers such as silicone modified acrylics, fluorine modified acrylics, acrylsilicone and epoxy-acrylics. One type or two or more types of these polymers may be employed. “(Meth)acryl” herein is a simplified description of methacryl or acryl. In particular, an organic polymer classified as poly(meth)acrylate (acrylic polymer compound) and poly[styrene-(meth)acrylate] (styrene-acrylate polymer compound) is preferably used in view of the transparency or light yellowing resistance of the ink absorption layer finally obtained and in view of the storage stability of the recording medium obtained.

Fine particles (C), when they are an organic polymer compound, are preferably obtained as a polymer emulsion and are obtained by using well known manufacturing technology for polymer emulsions. In more detail, the technology includes methods for emulsion polymerization by dissolving the above-described surfactant in an aqueous solvent, adding and emulsifying monomer components described later and adding a free radical initiator to perform the reaction using various methods such as: batch-wise addition, continuous drop-wise addition and a serial addition.

As a monomer to obtain fine particles (C), as an organic polymer compound, one type or two or more types of unsaturated ethylenic monomers may be used in combination. The monomers typically include: (meth)acrylate ester, (meth)acrylamide monomer and vinyl cyanides. Examples of a (meth)acrylate ester are alkyl (meth)acrylate having an alkyl group with 1–18 carbon atoms, hydroxyalkyl (meth) acrylate having an alkyl group with 1–18 carbon atoms, polyoxyetylene (meth)acrylate having 1–100 ethyleneoxide units, polyoxypropylene (meth)acrylate having 1–100 propyleneoxide units and polyoxyethylene di(meth)acrylate having 1–100 ethyleneoxide units. Typical examples of alkyl (meth)acrylate having an alkyl group with 1–18 carbon atoms include: methyl (meth)acrylate, ethyl (meth)acrylate, n-butyl (meth)acrylate, 2-ethylhexyl (meth)acrylate, cyclohexyl. (meth)acrylate, methylcyclohexyl (meth)acrylate and dodecyl (meth)acrylate. Typical examples of hydroxyalkyl (meth)acrylate having hydroxyalkyl group with 1–18 carbon atoms include: 2-hydroxyethyl (meth)acrylate, 2-hydroxypropyl (meth)acrylate, 2-hydroxycyclohexyl (meth)acrylate and dodecyl (meth)acrylate. Typical examples of (poly) oxyetylene (meth)acrylate having 1–100 ethyleneoxide units include: ethylene glycol (meth)acrylate, ethylene glycol 3-methoxy(meth)acrylate, diethylene glycol (meth)acrylate, diethylene glycol 3-methoxy(meth)acrylate, tetraethylene glycol (meth)acrylate and tetraethylene glycol 3-methoxy (meth)acrylate. Typical examples of (poly)oxypropylene (meth)acrylate having 1–100 propyleneoxide units include: propylene glycol (meth)acrylate, propylene glycol 3-methoxy(meth)acrylate, dipropylene glycol (meth)acrylate, dipropylene glycol 3-methoxy(meth)acrylate, tetrapropylene glycol (meth)acrylate and tetrapropylene glycol 3-methoxy(meth)acrylate. Typical examples of (poly)oxyethylene di(meth)acrylate having 1–100 ethyleneoxide units include: ethylene glycol di(meth)acrylate, diethylene glycol di(meth)acrylate, diethylene glycol 3-methoxy(meth)acrylate and tetraethylene glycol di(meth)acrylate. Typical examples of (meth)acrylamide monomer include, for example, (meth)acrylamide, N-methylol(meth)acrylamide, N-butoxymethyl(meth)acrylamide and diacetoneacrylamide. Typical examples of vinyl cyanides include, for example, (meth)acrylonitrile. Typical examples of monomers other than the above-described monomers include olefins such as ethylene, propylene and isobutylene; dienes such as butadiene; halogenated olefins such as vinyl chloride and vinylidene chloride; vinyl carboxylates such as vinyl acetate, vinyl propionate, vinyl n-butylate, vinyl benzoate, vinyl t-butylbenzoate, vinyl pivalate, vinyl 2-ethylhexanoate, vinyl versatate and vinyl laurylate; isopropenyl carboxylate such as isopropenyl acetate and isopropenyl propionate; vinyl ethers such as ethyl vinyl ether, isobutyl vinyl ether and cyclohexyl vinyl ether; styrene derivatives such as styrene and methylstyrene; aromatic vinyl compounds such as vinyltoluene; allyl esters such as allyl acetate and allyl benzoate; allyl ethers such as allyl ethyl ether, allyl glycidyl ether and allyl phenyl ether; further, γ-(meth) acryloxypropyltrimethoxysilane, vinylmethyldiethoxysilane, vinylmethyldimethoxysilane, vinyldimethylethoxysilane, vinyldimethymethoxysilane, vinyltrimethoxysilane, vinyltriethoxysilane, 4-(meth)acryloyloxy-2,2-6,6-tetramethylpiperridine, 4-(meth)acryloyloxy-1,2,2-6,6-pentamethylpiperridine, perfluoromethyl (meth)acrylate, perfluoropropyl (meth)acrylate, perfluoropropylomethyl (meth)acrylate, vinylpyrrolidone, trimethylolpropane tri(meth)acrylate, glycidyl (meth)acrylate, 2,3-cyclohexeneoxide (meth)acrylate, allyl (meth)acrylate, acidphosphoxyethyl methacrylate, 3-chloro-2-acidphosphoxypropyl methacrylate, methylpropanesulfonic acid acrylamide and divinylbenzene. "(Meth) acryl" herein is a simplified designation of methacryl and acryl.

The glass transition point of the fine particle (C), when it is an organic polymer, is not particularly limited, but −50 to +150° C. is preferable in view of film forming ability and −50 to +30° C. is generally preferable in view of flexibility provided to a recording medium obtained. However, when polymer emulsion of the present invention is used in manufacturing an ink jet recording medium, the glass transition point is preferably 30 to 130° C. when ink absorption by the ink jet recording medium is important, whereas −50–30° C. is preferable when flexibility of the ink jet recording medium obtained and transparency of an ink absorption layer are important.

When the fine particles (C) are an inorganic compound, the following compounds can be used: for example, light calcium carbonate, heavy calcium carbonate, magnesium carbonate, kaolin, clay, talc, calcium sulfate, barium sulfate, titanium dioxide, zinc oxide, zinc hydroxide, zinc sulfide, zinc carbonate, hydrotalcite, aluminum silicate, diatomite, calcium silicate, magnesium silicate, synthetic amorphous silica, colloidal silica, fumed silica, alumina, colloidal alumina, psuedo-boehmite type alumina, aluminium hydroxide, zeolite, magnesium hydroxide, along with oxides of metals such as zirconium, titanium, tantalum, niobium, tin and tungsten; and phosphate of metals such as aluminium, vanadium, zirconium and tungsten; compounds in which a part of said inorganic compound is substituted by other elements; and compounds the surface of which has been modified with organic substances. These inorganic fine particles may be used alone or in combination of two or more types.

Colloidal silica and fumed silica, in particular, are preferably used as a fine particles (C). The use of colloidal silica and fumed silica is preferable because of the improved image quality and the gloss provided to printing materials on the recording medium obtained. The type of colloidal silica is not particularly limited. Anionic colloidal silica and cationic silica are usually used. These are obtained by reaction with a polyvalent metal compound such as aluminium. The type of fumed silica is not particularly limited, but a silica obtained by a vapor phase method; that is synthesized by combustion of silicon tetrachloride with hydrogen and oxygen, is preferably used. Fumed silica may be used as it is or after surface modification with a silane coupling agent.

In manufacturing an ink jet recording medium, it is preferable to use alumina sol and a psuedo-boehmite type alumina fine particle as a fine particle (C). Use of alumina sol and a psuedo-boehmite type alumina fine particles can improve image quality when printing on an ink jet recording medium and provides water resistance to the printed image.

Fine particles (C) may be used in the present invention as a primary particle, as is, or in a state forming a secondary particle. Any diameter of particles (C), forming a core, can be employed, but the number average particle diameter is preferably not larger than 10 μm and more preferably not larger than 1 μm in order to obtain a recording medium with a smooth surface. Furthermore, when an emulsion of the present invention is used in manufacturing an ink jet recording medium, fine particles (C) with a number average primary particle diameter of preferably not larger than 200 nm, more preferably not larger than 100 nm, and more preferably not larger than 50 nm are used to increase optical density (color density) of the printed part after printing, to provide gloss similar to that of a silver halide photograph.

The lower limit of the diameter of the fine particles (C) is not particularly limited, but a number average particle diameter of not smaller than about 3 nm is desirable in view of productivity. "Number average particle diameter" herein means a value as measured by a dynamic light scattering method.

Further, as fine particles (C), it is particularly preferable, in view of ink absorption of a coating layer obtained, to use a porous material, which is manufactured using a metal oxide and/or precursor thereof as a metal source, via a process (i) to manufacture a composite material by mixing and reacting the metal source, template and water, and a process (ii) to remove the template from said composite material, and have a difference of specific surface areas (SB-SL) not smaller than 250 $m^2/g$, wherein SL is a reduced specific surface area calculated from an average particle diameter DL as measured by a dynamic light scattering method and SB is a specific surface area as determined by nitrogen adsorption using a BET method. "Porous" herein means fine pore state in pore distribution as determined by a nitrogen adsorption method. Here, a reduced specific surface area SL ($m^2/g$) determined from an average particle diameter DL, which is measured by a dynamic light scattering method, can be calculated according to the following formula: $SL=6\times10^3$/density ($g/cm^3$)$\times$DL(nm), provided that the particles are spherical. The difference between SL value and SB value, determined by nitrogen adsorption using a BET method, (SB-SL), is not smaller than 250 $m^2/g$ indicating that a particle is very porous and use of said porous material in manufacturing an ink jet recording medium is particularly preferable in view of ink absorption.

The particle diameter of said porous material is not particularly limited, but generally a DL of not larger than 10 μm, and preferably not larger than 1 μm is used in order to provide a smooth surface to the recording medium. Furthermore, in manufacturing an ink jet recording medium, fine particles (C) with a DL of preferably not larger than 300 nm, more preferably not larger than 150 nm, are used to obtain an enhanced optical density (color density) of the printed part after printing and a gloss similar to that of silver halide photograph.

The lower limit of particle diameter of said porous material is not particularly limited, but a number average diameter of not smaller than about 10 nm is desirable in view of production efficiency of said porous material.

The metal source used in the synthesis of said porous material is a metal oxide and/or a precursor thereof and includes: silicon, group 2 metals; alkaline earth metals such as magnesium, calcium, and zinc; group 3 metals such as aluminium, gallium and rare earth metals; group 4 metals such as titanium and zirconium; group 5 metals such as phosphorus and vanadium; group 7 metals such as manganese and tellurium; and group 8 metal such as iron and cobalt. Metal precursors include: inorganic salts of these metals such as nitrates and hydro chlorides; organic acid salts such as acetates and naphthenates; organometallic salts such as alkylalminium; alkoxide; and hydroxide, and may include compounds other than the above compounds as long as they can be synthesized by the synthesis method described later.

When silicon is selected as a metal, alkoxides such as tetraethoxysilane or activated silica can be preferably used as a metal source. Said activated silica can be prepared by extraction from water glass with an organic solvent or by ion exchange of water glass. Use of cheap water glass as a raw material is preferable in view of industrial use. In particular, when water glass is prepared by contacting with a $H^+$ type cation exchanger, use of cheap No. 3 water glass with a low Na content is industrially preferable. As a cation exchanger, a strong acid type of ion exchange resin such as sulfonated polystyrene-divinylbenzene (for example, "Amberlite IR-120B": trade name from Rohm & Haas Corp.) is preferably used, but not limited to this.

When aluminium is selected as a metal, alkali aluminates, typically, sodium aluminate, potassium aluminate, lithium aluminate, ammonium aluminate and guanidine aluminate can be preferably used as a metal source.

Said template is not particularly limited as long as it has an interaction with the metal source compound, but use of a nonionic surfactant is preferable in manufacturing said porous material because the template can be easily removed by using water or a mixture of water and an organic solvent in the template removal process.

As nonionic surfactants, a surfactant having the structural formula: $HO(C_2H_4O)_a—(C_3H_6O)_b—(C_2H_4O)_cH$ (wherein, a and c are 10–110; b is 30–70) or a structural formula of $R(OCH_2CH_2)_nOH$ (wherein, R is an alkyl group with carbon atoms of 12–20; and n is 2–30) are preferable. These typically include "Pluronic P103", "Pluronic P123" and "Pluronic P85" (trade names of surfactants from Asahi Denka Kogyo K.K.); polyoxyethylene lauryl ether, polyoxyethylene cetyl ether and polyoxyethylene stearyl ether.

To alter the pore diameter of said porous material, it is possible to add, as an organic auxiliary, an aromatic hydrocarbon of 6–20 carbon atoms, an alicyclic hydrocarbon of 5–20 carbon atoms, an aliphatic hydrocarbon of 3–16 carbon atoms, and a substituted compound thereof. The carbon atoms can be substituted by amine and halogen. Examples of suitable organic auxiliaries include toluene, trimethylbenzene and triisopropylbebzene.

Hereinbelow, a method for manufacturing said porous material will be explained.

Reaction between a template and a metal can be performed by mixing a solution or a dispersion of the metal source in a solvent and a solution or a dispersion of the template in a solvent under stirring, but is not so limited. As a solvent, water or a mixed solvent of water and an organic solvent may be used. As an organic solvent, alcohol is preferable. As an alcohol, lower alcohols such as ethanol and methanol are preferable.

The compositions used in these reactions depend on the template, the metal source and the solvent, but it is necessary to select a condition within a range so as not to cause coagulation or precipitation and so as not to make the particle diameters large. Further, alkalis such as NaOH or a stabilizer such as low molecular weight PVA may be added to prevent coagulation or precipitation of the particles.

For example, when activated silica, "Pluronic P103" and water are used as a metal source, a template and a solvent, respectively, the following composition can be used: Ratio by weight of P103/$SiO_2$ in the range of preferably 0.01–30 and more preferably 0.1–5; ratio by weight of an organic auxiliary/P103 in the range of preferably 0.02–100 and more preferably 0.05–35, and ratio by weight of water/P103 in a range of preferably 10–1,000 and more preferably 20–500. NaOH may be added as an stabilizer with a weight ratio of NaOH/$SiO_2$ in a range of $1\times10^{-4}$–0.15.

When said porous material contains silicon and aluminium, the atomic ratio Al/Si is preferably 0.003–0.1 and more preferably 0.005–0.05.

The reaction may proceed at room temperature, but it may optionally be performed at temperatures up to 100° C. The reaction time is in a range of 0.5–100 hours, preferably in a range of 3–50 hours. The range of pH during the reaction is preferably 2–13, more preferably 4–12. Alkalis such as NaOH or acids such as hydrochloric acid and sulfuric acid may be added to control pH.

After manufacturing, said composite material can be subjected to a modification process, by heating at 40–95° C. in the presence of an alkali aluminate. When the composite material contains silicon, this process provides a sol with long-term storage stability even under acidic conditions or in the presence of a cationic substance. The alkali aluminate used includes: sodium aluminate, potassium aluminate, lithium aluminate, ammonium aluminate and guanidine aluminate. Sodium aluminate is preferable. Said modification process may be practiced before or after removal of the template from a composite material.

Hereinbelow, a modification method will be explained for a case before the template removal. After manufacturing of the composite material, a solution of alkali aluminate is added to the reaction solution at 0 to 80° C., preferably at 5 to 40° C. under stirring. The concentration of alkali aluminate to be added is not particularly limited, but 1–20% by weight is preferable. The amount to be added, as an atomic ratio of Al/Si, is preferably 0.003–0.1, more preferably 0.005–0.05. After the addition, it is heated preferably at 40 to 95° C. and more preferably at 60 to 80° C. Heating at a temperature not higher than 40° C. tends to cause gelling, and thus a sufficient stability is not obtained under acidic conditions when a sol is formed.

Next, a method for removing a template will be explained. Porous materials are obtained by adding a solvent such as alcohol to the reaction solution. The template is removed from the composite material using ultrafiltration equipment. In this process, alkalis such as NaOH or a stabilizer such as low molecular weight PVA may be added to prevent coagulation of particles. Any solvent may be used for removal as long as it dissolves the template. Alcohols are preferable due to ease in handling and high solubility. As alcohols, lower alcohols such as methanol and ethanol are preferable. The removal temperature depends on the solvent and a template used, but 20 to 80° C. is preferable. The template thus removed can be reused by removing the solvent. Alternatively, porous materials may also be obtained by filtering composite materials obtained, washing with water, drying, followed by removing the template contained either by contacting with a solvent such as a supercritical fluid or alcohol or by firing. The firing temperature is not lower than the temperature at which the template is burnt off, that is, about 500° C. The firing time is appropriately set in relation to the temperature, and is about 30 minutes to 6 hours. Removal methods include: mixing of a solvent with the composite material under stirring, and pouring a solvent over the composite material while it is in a column.

The present invention also provides a method for manufacturing a recording medium in accordance with the above-described inventions 24) and 25). When the coating liquid of the present invention is applied on a substrate at a temperature above the temperature-sensitive point of the polymer compound (A) or a polymer compound of the present invention (that is, a temperature at which the polymer compound (A) shows lipophilicity), said coating liquid having lower viscosity and thus higher concentration can be obtained compared with a case when said coating liquid is applied to a substrate at a temperature not higher than said temperature-sensitive point (that is, a temperature at which the polymer compound (A) shows hydrophilicity) or when other water soluble polymer such as polyvinyl alcohol is used instead of a polymer emulsion of the present invention. Namely, it is possible to save time or energy necessary for drying, thus leading to a more economical manufacturing of the recording medium. Furthermore, application of a coating liquid on the substrate at a temperature above the temperature-sensitive point of the polymer compound (A), provides a higher void ratio to the coating layer obtained and better ink absorption, and is thus particularly useful in an ink jet recording medium. The reason for this is not clear, but it is supposed that since the polymer emulsion is formed due to lipophilicity of a polymer compound (A), and hardly penetrates into micro pores and fills up the voids effective to ink absorption resulting in expression of a good ink absorption.

The coating liquid of the present invention has a relatively low viscosity at temperatures above said temperature-sensitive point of the polymer compound (A) or a polymer emulsion of the present invention, however, said coating liquid abruptly becomes thick (or form a gel) when cooled down to a temperature not higher than said temperature-sensitive point. Said thickening is caused by a change in a polymer (A) from lipophilic to hydrophilic. Namely, a very smooth and homogeneous coating layer, formed by a coating liquid with relatively low viscosity, can be fixed as it is due to subsequent thickening (or gelling) by cooling down a coating liquid of the present invention to a temperature not higher than the temperature-sensitive point, and soon after application to the substrate at a temperature above said temperature-sensitive point. Good surface state and homogeneity of the coating layer can be retained even after a drying process and thus the coating layer with good quality can be obtained.

The cooling temperature after an application is lowered preferably by at least 5° C., more preferably by at least 10° C. from said temperature-sensitive point, in view of film forming ability and transparence of the coated layer obtained.

It is preferable to dry said coating liquid by warm air, after a process of applying onto the substrate at a temperature above said temperature-sensitive point then cooling to a temperature not higher than said temperature-sensitive point. An efficient cooling can be performed by strongly blowing warm air onto the coated surface. It is found that a faster drying rate provides better film forming ability of the coating liquid and less occurrence of micro cracks, although reason is not clear. The above-described effect is preferably observed, in particular, in such conditions that drying is substantially completed within 5 minutes after a process of applying said coating liquid on a substrate at a temperature above the temperature-sensitive point then cooling down said coating liquid to a temperature not higher than the temperature-sensitive point. In manufacturing an ink jet recording medium, a coated layer with better ink absorption is obtained in such condition. “Drying is substantially completed” herein means that the water content reaches a level not much higher than that attained in an equilibrium state, while handling said recording medium under room conditions.

Furthermore, it is preferable that the polymer compound (A) used in the present invention forms a polymer emulsion in the coating liquid before application, because a recoding medium obtained by using a coating liquid for said recording medium provides a coated film with a better, more homogeneous coated layer than a recording medium obtained by the use of a coating liquid which did not form an emulsion, i.e. when a polymer compound (A) coagulates or forms coarse agglomerates in the coating liquid.

When a polymer compound (A) forms an emulsion in a coating liquid before application, a recording medium obtained by using said coating liquid provides a better recording medium with fewer cracks on the surface of the recording medium and with superior surface smoothness compared to a recording medium obtained by using a coating liquid containing an emulsion composed of a polymer compound which does not exhibit a temperature responsibility (no change between hydrophilicity and lipophilicity).

The solvent used in a coating liquid for recording medium of the present invention is not particularly limited. Preferred solvents include water and water-soluble solvents such as alcohols, ketones and esters. Furthermore, pigment dispersing agents, thickeners, flow modulators, antifoaming agents, foam suppressing agents, mold releasing agents, foaming agents and colorants may be added to said coating liquid if necessary.

It is preferable that the coating liquid for the recording medium of the present invention contains a polymer emulsion of the present invention and at least two types of fine particles (C), and one kind of which is colloidal silica. Incorporation of colloidal silica provides an improved film forming ability. Colloidal silica includes the usual spherical colloidal silica and bead-like connected and/or branched shapes of colloidal silica. Bead-like connected and/or branched shapes of colloidal silica are preferably used.

It is preferable in the present invention to use beads-like connected and/or branched shape of colloidal silica as fine particles (C) due to improvement of not only film forming ability but also ink absorption. "Bead-like connected and/or branched shape of colloidal silica" herein means spherical colloidal silica with a bead-like connected long chain structure and connected silica with a branched or a bent structure, and is obtained, for example, by bonding adjacent spherical primary silica particles with a metal ion having a valence of two or more. The diameter of said colloidal silica is not particularly limited, but it is preferable that the number average particle diameter, as measured by a dynamic light scattering method, is 20–400 nm, more preferably 20–200 nm. Typically, "Snowtex UP", "Snowtex OUP", "Snowtex PS-M", "Snowtex PSL", "Snowtex PS-S" and "Snowtex PS-SO" from Nissan Chemical Ind. Co., Ltd. are exemplified.

The diameter of the primary particles of colloidal silica used in the present invention is not particularly limited, but an average particle diameter of 4–100 nm, as measured by BET method is preferably used. The amount of colloidal silica of the present invention to be used is not particularly limited, but it is preferably 1–900 parts by weight, more preferably 5–200 parts by weight based on 100 parts by weight of fine particles (C) other than the colloidal silica.

The coating liquid for recording medium of the present invention preferably contains a polymer emulsion of the present invention and at least two types of fine particles (C), one kind of which is fumed silica. Incorporation of fumed silica improves ink absorption. Fumed silica used in the present invention is not particularly limited, but fumed silica, which is synthesized by combustion of silicon tetrachloride, methyltrichlorosilane, trichlorosilane and the like with hydrogen and oxygen, is preferably used. Typically, "Aerosil" (trade name of a product from Japan Aerosil Co. Ltd.) and "Reolosil" (trade name of a product from Tokuyama Co. Ltd.) are exemplified. Fumed silica may be used as is, after surface modification with a silane coupling agent, or after being partially admixed with alumina.

The diameter of the primary particle of fumed silica used in the present invention is not particularly limited, but a primary particle with an average particle diameter of 4–50 nm as measured by a BET method is preferably used. An amount of dry silica of the present invention to be used is not particularly limited, but it is preferably 1–900 parts by weight, more preferably 5–200 parts by weight based on 100 parts by weight of fine particles (C) other than fumed silica.

The content of the polymer emulsion of the present invention in the coating layer is not particularly limited, but each coating layer contains preferably at least 5% by weight of polymer emulsion of the present invention based on total solids content of said coating layer, in view of the film forming ability, and preferably not more than 60% by weight and more preferably 5–40% by weight for an ink jet recording medium, in view of ink absorption.

A water-soluble resin (E) can be used in combination with polymer emulsions of the present invention to provide further good film forming ability in the present invention. The water-soluble resin (E) is not particularly limited, but includes; polyvinyl alcohol; polyvinyl alcohol derivatives such as cationically modified polyvinyl alcohol and silanol-modified polyvinyl alcohol; polyvinylpyrrolidone, polyacrylamides, starch and starch derivatives; cellulose derivatives such as carboxymethyl cellulose and hydoxyethyl cellulose; casein and gelatin. Among them, polyvinyl alcohol and polyvinyl alcohol derivatives such as cationically modified polyvinyl alcohol and silanol-modified polyvinyl alcohol are more preferably used. The content of said water-soluble resin (E) is preferably 1–400 parts by weight and more preferably 5–100 parts by weight based on 100 parts by weight of a polymer emulsion of the present invention, in view of ink absorption.

Other organic binders may be used in combination in the present invention. For example, polyvinyl acetates, polyacetals, polyurethanes, polyvinyl butylals, poly(meth)acrylic acids (esters), polyamides, polyester resin, urea resin and melamine resin are included.

In manufacturing an ink jet recording medium in the present invention, it is preferable that at least one layer of the ink absorption layers includes a cationic polymer (F). Incorporation of a cationic polymer (F) improves water resistance of the printed part. Said cationic polymer (F) is not particularly limited as long as it is cationic, but polymers having at least one kind of substituent with primary amine, secondary amine and tertiary amine groups, salts thereof and quaternary ammonium salt groups are preferably used. The polymers include, for example, polymers of dimethyldiallylammonium chloride, copolymer of dimethyldiallylammonium chloride and acrylamide, polymer of alkylamine, polymer of polyaminedicyan and polyallylamine hydrochloride. The molecular weight of said cationic polymer (F) is not particularly limited, but polymers with a weight average molecular weight of 1,000–200,000 are preferably used. The amount of cationic polymer (F) to be used is not particularly limited, but is preferably 0.1–200 parts by weight, more preferably 10–100 parts by weight based on 100 parts by weight of polymer emulsion, in view of the water resistance of the coating film. Furthermore, it is preferable to use a cationic polymer (F) only having a substituent with a quaternary ammonium salt group, in view of the degree of color fading caused by exposure of printed matter to sunlight or fluorescent light.

In manufacturing an ink jet recording medium in the present invention, it is preferable that at least one layer of the ink absorption layers includes a UV absorbing agent, a hindered amine type light stabilizer, a singlet state oxygen quencher and an antioxidant. Incorporation of said substances improves light resistance of the printed matter. The type of UV absorbing agent is not particularly limited, but those of the benzotriazole type, benzophenone type, titanium oxide, cerium oxide and zinc oxide are preferably used. Hindered amine type light stabilizers are not particularly limited, but compounds having a piperidine ring in which the N atom is in the form of N—R, wherein, R is hydrogen atom, alkyl group, benzyl group, allyl group, acetyl group, alkoxyl group, cyclohexyl group, benzyloxy group and the like, are preferably used. The singlet state oxygen quencher is not particularly limited, but aniline derivative, organonickel type, spiro-coumarone type and spiro-indan type are preferably used. The antioxidant is not particularly limited, but those of the phenol type, hydroquinone type, organosulfur type, phosphorous type and amine type are preferably used. The amount of said substances to be used in an ink absorption layer containing said substances, is preferably 0.0001–20 parts by weight based on 100 parts by weight of said ink absorption layer.

In the present invention, in manufacturing an ink jet recording medium, it is preferable that at least one layer of the ink absorption layers contains an alkali earth metal compound. Incorporation of an alkali earth metal compound improves light resistance. As an alkali earth metal compound, oxides, halides and hydroxides of magnesium, calcium and barium are preferably used. A method for incorporating the alkali earth metal compound in an ink absorption layer is not particularly limited. The alkali earth metal compound may be added to the coating liquid or an aqueous solution of the alkali earth metal compound may be impregnated into the ink absorption layer after the ink absorption layer is formed. The content of the alkali earth metal compound in an ink absorption layer containing an alkali earth metal compound is preferably 0.5–20 parts by weight as an oxide thereof, based on 100 parts by weight of the solid content in said ink absorption layer.

In the present invention, a gloss layer may be provided as the top surface layer. The method for providing a gloss layer is not particularly limited and includes a method for containing an ultra-fine pigment such as colloidal silica and/or fumed silica, super calender method, gloss calender method and casting method.

The present invention also provides a recording medium in accordance with inventions 26)–28).

In the present invention, in manufacturing an ink jet recording medium, substrates such as polyester film, resin coated paper, coated paper and ordinary paper are preferably used. There is no limitation as long as the substrate can be provided with a coating layer, such as glass, aluminium foil, cloth, non-woven fabric, vapor deposited paper and vapor deposited film. In the present invention, polyester film and resin coated paper are particularly preferably used.

Polyester film is obtained, for example, by film formation of polyester obtained by polycondensing an aromatic dicarboxylic acid such as terephthalic acid, isophthalic acid and naphthalenedicarboxylic acid or esters thereof and a polyvalent alcohol such as ethylene glycol, diethylene glycol, 1,4-butanediol and neopentyl glycol, then film forming the polyester obtained above. The film is often subjected to orientation treatment by a process such as roll stretching, tensile stretching and stretching by blowing. Typical polyester includes polyethylene terephthalate, polyethylenebutylene terephthalate, polyethylene-2,6-naphthalate and copolymers thereof with other components, but is not limited to these in the present invention.

The coating resin used for resin coated paper is preferably a polyolefin resin. Polyethylene resin is particularly preferable. A method for forming a resin coated layer includes a so called melt extrusion method, where a molten polyolefin resin is cast on a running base paper sheet or a method for coating an emulsion of film formable resin on a paper to be resin coated. Another method is coating of an emulsion having a minimum film forming temperature (MFT) higher than room temperature on a base paper sheet to be resin coated, followed by heating at a temperature not lower than the MFT.

The surface of a substrate on which a coating layer is applied has a gloss surface or a mat surface depending on applications, and in particular, a gloss surface is preferably used. Coating a resin on the back side surface is not necessarily required, but resin coating on the back side is preferable to prevent curling.

In a resin for resin coated paper, various additives may be added in a suitable combination. Such additives include white pigments such as titanium oxide, zinc oxide, talc and calcium carbonate; fatty acid amides such as octadecylamide and arachidic acid amide; metal salts of fatty acids such as zinc stearate, calcium stearate, aluminum stearate and magnesium stearate; antioxidants such as Irganox 1010 and Irganox 1076; blue pigments or dyes such as cobalt blue, ultramarine blue, cerulean blue and phthalocyanine blue; magenta pigments or dyes such as cobalt violet, fast violet and manganese violet; fluorescent whiteners and UV absorbers.

The base paper sheet used for resin coated paper is not particularly limited and papers for general use can be employed. As a pulp, a component of base paper sheet, natural pulp, regenerated pulp and synthesized pulp are used alone or in combination of two or more types. In this base paper sheet, additives generally used in paper making can be included. Such additives include sizing agents, paper strengthening agents, fillers, antistatic agents, fluorescent whiteners and dyes. Furthermore, additives such as surface sizing agents, surface paper strengthening agents, fluorescent whiteners, antistatic agents, dyes and anchor agents may be applied to the surface.

The base paper sheet, used for resin coated paper, preferably has a good surface smoothness formed by applying pressure and compression by, for example, calendaring during or after paper making. A base paper sheet with Beck's smoothness of at least 200 seconds as measured in accordance with JIS-P-8119 is most preferable. The sheet preferably weighs 30–250 g/m$^2$.

The coating liquid of the present invention can form a coating layer usable as a recording medium with a high level of light transmission as required for an OHP film and the like. In a recording medium with a high level of light transmission as required for an OHP film and the like, not only composition and light transmission of a coating layer but also optical characteristics of a substrate are important. In order to obtain a recording medium with a high level of light transparency, a transparent substrate with a haze (clouding value) in accordance with JIS-K-7105 of preferably not higher than 3.0, and more preferably not higher than 1.0 is used.

Haze (clouding value) in accordance with JIS-K-7105 of a recoding medium used as an OHP film is preferably not higher than 5.0 as a recording medium with a coating layer on a substrate. The thickness of the substrate used in an OHP film is not particularly limited, but about 30–200 μm is preferable in view of paper feeding aptitude to a printer.

In the present invention, when a film or a resin coated paper is used as a substrate, a surface of the substrate to be coated is preferably treated with corona discharge, flame, UV irradiation or plasma before coating.

The substrate may have an undercoat layer to enhance adhesion between the layer containing fumed silica and a substrate or to regulate an electric resistance. In particular, when a film or a resin coated paper is used as a substrate, it is preferable to provide an undercoat layer on a surface where a coating layer is provided. The undercoat layer includes a polymer compound such as an acryl resin, polyester resin, polyvinylidene chloride resin, polyvinyl chloride resin, polyvinyl acetate resin, polystyrene resin, polyamide resin, polyurethane resin and gelatin. A cross-linking agent, pigment and surfactant can be added in suitable combination. To apply the undercoat, said polymer may be used by dissolving it in a solvent such as water and an organic solvent or as an emulsion form. The thickness of the undercoat layer is preferably 0.01–5 μm (as dry film thickness) on the substrate.

On a substrate in the present invention, various back coat layers can be provided to enhance characteristics such as antistatic characteristics, transportation, curling prevention, writing and sizing. Various additives can be added to a back coat layer such as inorganic antistatic agents, organic antistatic agents, hydrophilic binders, latices, cross-linking agents, pigments, lubricants and surfactants in suitable combination.

When a recording layer is placed on only one surface of the base material an antireflection film can be placed on only the opposite surface or on both surfaces to enhance light transmission. This is useful when the base material is used in an overhead projector.

The coating layer of the present invention may be provided only on one surface of the substrate or on both surfaces for both-side recording or to suppress deformation such as curling.

Manufacturing equipment in accordance with the present invention preferably comprises a means to apply the coating liquid containing at least the polymer emulsion of the present invention on the substrate at a temperature above the temperature-sensitive point of said polymer emulsion, a means to cool down the coating layer to a temperature not higher than the temperature-sensitive point soon after application, and a means to dry the coating layer.

As a means for application on a substrate, various units can be used on-machine or off-machine, such as various types of blade coaters, roll coaters, air knife coaters, bar coaters, rod blade coaters, curtain flow coaters, gate roll coaters, short dwell coaters, extrusion die coaters, size press and spray.

Simultaneous multi-layer coating can be performed to form multiple coating layers on a substrate. Simultaneous multi-layer coating can be accomplished, for example, using an extrusion die coater or a curtain flow coater. An extrusion die coater is more preferable to avoid mixing or integration of multiple coating layers. In using an extrusion die coater, multiple application liquids simultaneously extruded are laminated near the exit of an extrusion die coater, that is, just before being transferred to a surface of substrate, and thus applied on the substrate in multiple layers as they are. In said simultaneous multiple application, a barrier layer liquid (an intermediate layer liquid) can also be applied simultaneously between coating layers, to avoid mixing of the multiple coating liquids. Said barrier layer is not particularly limited as long as the layer is difficult to mix with the upper and lower coating layers. A thixotropic liquid is preferably used. Such liquid preferably includes an aqueous solution of polymer such as hydroxypropylmethyl cellulose, methyl cellulose, hydroxyethylmethyl cellulose, polyvinylpyrrolidone and gelatin.

As measures for cooling a coating layer, known measures such as a cool air blower, an air blower and a freezer can be used. Cool air blower is preferably used. The temperature of cooling air varies depending on the temperature-sensitive point of the polymer emulsion of the present invention. The air preferably has a temperature not higher than said temperature-sensitive point, more preferably a temperature lower by 5° C. or more than said temperature-sensitive point and further preferably a temperature lower by 10° C. or more than said temperature-sensitive point.

As means for drying a coating layer, known measures can also be used such as a hot air dryer, a steam heated dryer and a far infrared ray dryer. A hot air dryer is preferably used, however a drum dryer, an air cap dryer, an airfoil dryer, an air conveyer dryer and combinations thereof are also used. The drying temperature depends on the dryer type, but the temperature inside the dryer should be 50–200° C. and preferably 100–150° C.

The coating weight of the above-described ink receptor layer of a thus manufactured recording medium of the present invention is preferably 5–50 g/m$^2$, more preferably 10–40 g/m$^2$ as a solid content. A coating weight less than 10 g/m$^2$ results in no effect on color expression of dye compared with the case without an ink receptor layer, and coating weight above 40 g/m$^2$ may cause flaking from the ink receptor layer. The total thickness of the coating layer is preferably 5–50 μm, and more preferably 10–40 μm.

The recording medium of the present invention is useful in recording using ink compositions containing water soluble dye, oil soluble dye, aqueous pigment, oil pigment and the like. Said recording system includes, for example, an ink jet recording system where micro droplets of an ink composition are discharged and adhere to a surface of the recording medium, thermal recording where printing is performed via color expression by heating an ink composition, gravure printing, offset printing and other various printing systems as well as recording by writing tools such as a pen. In particular, the recording medium of the present invention is preferably used with printing by an ink jet recording system. Namely, a polymer emulsion of the present invention, a method for manufacturing a polymer emulsion of the present invention, a coating liquid for the recording medium of the present invention and a method for manufacturing a recording medium of the present invention are also useful in manufacturing a recording medium suitable for recording and printing by the above-described systems, and in particular, are useful in manufacturing an ink jet recording medium.

Furthermore, the polymer emulsion of the present invention has a low viscosity at a temperature above the temperature-sensitive point of the polymer (A) and shows superior thickening when cooled down to a temperature not higher than the temperature-sensitive point. It is thus useful as a viscosity controlling agent, for temperature control, as an aqueous thickener, for various paper coating applications and in paints for coating. It is particularly useful in a paint for spray coating.

The present invention will be explained in more detail using Examples and the like, but the present invention should not be construed to be limited by these Examples and the like.

Parts and % in Examples mean parts by weight and % by weight unless otherwise described.

Various measurement methods used in the Examples are as follows:

Number average particle diameter was measured by a dynamic light scattering method using "ELS-800" from Ohtsuka Electric Co., Ltd. Pore distribution, pore volume and specific surface area were measured with nitrogen using "Autosorb-1" from Kantachrome Corp. Pore diameter distribution was calculated by a BJH method. Specific surface area was determined by a BET method. Powder X-ray analysis chart was obtained by using "RINT2500" from Rigaku Co. Ltd.

The temperature-sensitive point of a polymer compound (A) in a polymer emulsion of the present invention was determined by adjusting a concentration of polymer compound (A) to 5% by weight with water while keeping the temperature above the polymerization temperature, then gradually lowering the temperature of said polymer emulsion, and thus measuring the temperature at which said liquid becomes transparent or shows gelling.

Printing characteristics were evaluated using a commercial ink jet printer ("PM-800C" from Seiko Epson Co., Ltd.) on a solid image print using yellow, magenta, cyan, black, green, red and blue inks.

Evaluation items were as follows, and results were scored in ten ranks, with "excellent" as 10, "good" as 8, "relatively good" as 6, "relatively poor" as 4, "poor" as 2 and "extremely poor" as 1. Further, in the ink absorption evaluation, those cases which failed to print due to poor film forming ability, were reported as NM (not measurable).

(1) Ink absorption: judged by ink bleeding and degree of ink transferred to a white paper when pressed on the printed part just after printing.

(2) film forming ability: judged by visual examination for cracks, surface smoothness and adhesion of coating film.

(3) transparency: judged by visual examination of the transparency of the coating film.

(4) water resistance of the coating film: judged by sensuous test on a water droplet on the coating film.

REFERENCE EXAMPLE 1

To a reactor equipped with an agitator, a reflux cooler, a dropping tank and a thermometer, 45 parts of water were charged and the inside of the reactor was heated to 80° C. Then, 0.3 parts of a 25% aqueous solution of "Adeka reasoap SE1025N" (trade name of a surfactant from Asahi Denka Kogyo K.K.) and 0.5 parts of a 2% aqueous solution of ammonium persulfate were added. After 5 minutes, a pre-emulsion of 5 parts of methyl methacrylate, 5 parts of butyl acrylate, 0.8 part of a 25% aqueous solution of "Adeka reasoap SE1025N", 1 part of a 2% aqueous solution of ammonium persulfate and 10 parts of water, prepared by a homogenizer, and a solution of 35 parts of N-isopropylacrylamide and 2 parts of diacetoneacrylamide dissolved in 185 parts of water were each started to be added to the reactor. The addition was completed in 4 hours. During the addition and till 1 hour after completion of the addition, the liquid temperature inside the reactor was kept at 80° C., then cooled to 50° C., followed by gradual addition of 130 parts of a 60% aqueous ethanol solution. By cooling the mixture to room temperature after completion of the addition of the ethanol solution, a binder (a) forming an emulsion with a solid resin content of 11% and a number average particle diameter of 100 nm was obtained. The temperature-sensitive point of the binder was measured and found to be 22° C.

REFERENCE EXAMPLE 2

To a reactor equipped with an agitator, a reflux cooler, a dropping tank and a thermometer, 360 parts of water were charged and the inside of the reactor was heated to 80° C. Then, 25 parts of a 25% aqueous solution of "Quartamin 86W" (trade name of a cationic surfactant from Kao Corp.), 7.5 parts of a 70% aqueous solution of "Emulgen 1135S-70" (trade name of a nonionic surfactant from Kao Corp.), and 4 parts of a 70% aqueous solution of quaternary methyl chloride salt of N,N-dimethylaminopropylacrylamide were added to said reactor. Furthermore, 8 parts of a 5% aqueous solution of 2,2'-azobis(2-methylpropionamidine) dibasic acid salt were charged into said reactor. After 5 minutes, a mixture of 9 parts of methyl methacrylate, 9 parts of butyl acrylate, 9 parts of styrene, 2 parts of diacetoneacrylamide and 2 parts of ethyl 2-hydroxymethacrylate were added continuously to said reactor over 30 minutes, while keeping the temperature inside the reactor at 80° C. The number average particle diameter of the emulsion at this stage was 11 nm. Subsequently, a solution of 290 parts of N-isopropylacrylamide, 10 parts of diacetoneacrylamide, 5 parts of a 70% aqueous solution of quaternary methyl chloride salt of N,N-dimethylaminopropylacrylamide, 10 parts of a 25% aqueous solution of "Quartamin 86W", 15 parts of a 25% aqueous solution of "Blemer QA" (trade name of a cationic reactive surfactant from NOF CORP.) and 11 parts of a 5% aqueous solution of 2,2'-azobis (2-methylpropionamidine) dibasic acid salt dissolved in 1,254 parts of water was started to be added to said reactor. The addition was completed in 4 hours. During the addition and till 1 hour after completion of the addition, the liquid temperature inside the reactor was kept at 80° C., then cooled to 50° C., followed by gradual addition of 1,000 parts of a 60% aqueous ethanol solution. By cooling to room temperature after completion of the addition of the ethanol solution, a binder (b) forming an emulsion with a solid resin content of 11% and a number average particle diameter of 100 nm was obtained. The temperature-sensitive point of the binder was measured and found to be 30° C.

REFERENCE EXAMPLE 3

To a reactor equipped with an agitator, a reflux cooler, a dropping tank and a thermometer, 212 parts of water and 1 part of a 25% aqueous solution of "Adeka reasoap SE1025N" were charged and the inside of the reactor was heated to 80° C. Then, 2 parts of acrylic acid, 2 parts of diacetoneacrylamide, 51 parts of methyl methacrylate, 5 parts of butyl methacrylate and 1 part of ethyl 2-hydroxymethacrylate were mixed. A pre-emulsion liquid was prepared from said monomer mixture and a mixture solution containing 10 parts of a 25% aqueous solution of "Adeka reasoap SE1025N" and 10 parts of a 2% aqueous solution of ammonium persulfate was homogenized and added dropwisely from a dropping tank to the reactor over two hours. During the addition and till 1 hour after completion of the addition, the liquid temperature inside the reactor was kept at 80° C. The number average particle diameter of the emulsion at this stage was 10 nm. Then, a mixture of 10 parts of a 2% aqueous solution of ammonium persulfate, 140 parts of N-isopropylacrylamide and 600 parts of water was started to be added to said reactor and the addition was completed over 2.5 hours. During the addition and till 1 hour after completion of the addition, the liquid temperature inside the reactor was kept at 80° C., then cooled to 50° C., followed by gradual addition of 780 parts of a 60% aqueous ethanol solution. A binder (c) forming an emulsion with a solid resin content of 11% and a number average particle diameter of 100 nm was obtained by cooling to room temperature after completion of the addition of ethanol solution. The temperature-sensitive point of the binder was measured and found to be 31° C.

REFERENCE EXAMPLE 4

To a reactor equipped with an agitator, a reflux cooler, a dropping tank and a thermometer, 200 parts of water were charged and the inside of the reactor was heated to 80° C. Then, 20 part of a 25% aqueous solution of "Quartamin 86W" (trade name of a cationic surfactant from Kao Corp.), 10 parts of a 70% aqueous solution of "Emulgen 1135S-70" (trade name of a nonionic surfactant from Kao Corp.), 15 parts of a 25% aqueous solution of "Blemer QA" (trade name of a cationic reactive surfactant from NOF CORP.) and 2 part of a 70% aqueous solution of quaternary methyl chloride salt of N,N-dimethylaminopropylacrylamide were added to said reactor. Furthermore, 15 parts of a 5% aqueous solution of 2,2'-azobis(2-methylpropionamidine) dibasic acid salt were charged into said reactor. After 5 minutes, a mixture of 15 parts of methyl methacrylate, 20 parts of butyl acrylate, 10 parts of styrene and 2 parts of diacetoneacrylamide were added continuously to said reactor over 1 hour, while keeping a temperature inside the reactor at 80° C. A number average particle diameter of the emulsion at this stage was 40 nm. Then, a solution of 90 parts of N-isopropylacrylamide, 4 parts of diacetoneacrylamide, 5 parts of ethyl 2-hydroxymethacrylate, 15 parts of a 25% aqueous solution of "Blemer QA" (trade name of a cationic surfactant from NOF CORP.) and 11 parts of a 5% aqueous solution of 2,2'-azobis(2-methylpropionamidine) dibasic acid salt dissolved in 380 parts of water were started to be added to said reactor. The addition was completed over 4 hours. During the addition and till 1 hour after completion of the addition, the liquid temperature inside the reactor was kept at 80° C., then cooled to 50° C., followed by gradual addition of 500 parts of a 60% aqueous ethanol solution. A binder (d) forming an emulsion with a solid resin content of 11% and a number average particle diameter of 80 nm was obtained by cooling to room temperature after completion of the addition of ethanol solution. The temperature-sensitive point of the binder was measured and found to be 29° C.

REFERENCE EXAMPLE 5

To a reactor equipped with an agitator, a reflux cooler, a dropping tank and a thermometer, 500 parts of 12% aqueous dispersion of "Snowtec PS-SO" (trade name of bead-like colloidal silica from Nissan Chem. Ind. Co., Ltd.) and 4 parts of a 25% aqueous solution of "Adeka reasoap SE1025N" were charged and the inside of the reactor was heated to 80° C. Then, a mixture of 10 parts of a 2% aqueous solution of ammonium persulfate, 140 parts of N-isopropylacrylamide, 4 parts of diacetoneacrylamide and 600 parts of water were started to be added to said reactor. The addition was completed over 4 hours. During the addition and till 1 hour after completion of the addition, a liquid temperature inside the reactor was kept at 80° C., then lowered to and kept at 50° C., to obtain a binder (e) forming an emulsion with a solid resin content of 16% and a number average particle diameter of 130 nm. The temperature-sensitive point of the binder was measured and found to be 32° C.

REFERENCE EXAMPLE 6

To a reactor equipped with an agitator, a reflux cooler, a dropping tank and a thermometer, 45 parts of water were charged and the inside of the reactor was heated to 80° C. Then, 0.3 parts of a 25% aqueous solution of "Adeka reasoap SE1025N" (trade name of a surfactant from Asahi Denka Kogyo K.K.) and 0.5 parts of a 2% aqueous solution of ammonium persulfate were added. After 5 minutes, a pre-emulsion of 5 parts of methyl methacrylate, 5 parts of butyl acrylate, 0.8 parts of a 25% aqueous solution of "Adeka reasoap SE1025N", 1 part of a 2% solution of ammonium persulfate and 10 parts of water, prepared by a homogenizer and a solution of 35 parts of N-isopropylacrylamide dissolved in 160 parts of water were each started to be added to the reactor. The addition was completed over 4 hours. During the addition and till 1 hour after completion of the addition, a liquid temperature inside the reactor was kept at 80° C., then kept at 50° C., to obtain a binder (f) forming an emulsion with a solid resin content of 20% and a number average particle diameter of 250 nm at 50° C. The temperature-sensitive point of the binder was measured and found to be 23° C.

REFERENCE EXAMPLE 7

To a reactor equipped with an agitator, a reflux cooler, a dropping tank and a thermometer, 200 parts of water were charged and the inside of the reactor was heated to 80° C. Then, 20 parts of a 25% aqueous solution of "Quartamin 86W" (trade name of a cationic surfactant from Kao Corp.), 15 parts of a 70% aqueous solution of "Emulgen 1135S-70" (trade name of a nonionic surfactant from Kao Corp.), and 3 parts of a 70% aqueous solution of quaternary methyl chloride salt of N,N-dimethylaminopropylacrylamide were added to said reactor. Furthermore, 15 parts of a 5% aqueous solution of 2,2'-azobis(2-methylpropionamidine) dibasic acid salt were charged into said reactor. After 5 minutes, a mixture of 25 parts of methyl methacrylate, 25 parts of butyl acrylate, 15 parts of styrene and 1 part of ethyl 2-hydroxymethacrylate was added continuously to said reactor over 1 hour, while keeping the temperature inside the reactor at 80° C. A number average particle diameter of the emulsion at this stage was 62 nm. Then, a solution of 70 parts of N-isopropylacrylamide, 4 parts of diacetoneacrylamide, 5 parts of a 70% aqueous solution of quaternary methyl chloride salt of N,N-dimthylaminopropylacrylamide, 15 parts of a 25% aqueous solution of "Blemer QA" (trade name of a cationic surfactant from NOF CORP.) and 11 parts of a 5% aqueous solution of 2,2'-azobis(2-methylpropionamidine) dibasic acid salt dissolved in 380 parts of water was started to be added to said reactor. The addition was completed over 4 hours. During the addition and till 1 hour after completion of the addition, the liquid temperature inside the reactor was kept at 80° C., then cooled to 50° C., followed by gradual addition of 500 parts of a 60% aqueous ethanol solution. A binder (g) forming an emulsion was obtained with a solid resin content of 11% and a number average particle diameter of 110 nm by cooling to room temperature after completion of the addition of the ethanol solution. The temperature-sensitive point of the binder was measured and found to be 34° C.

REFERENCE EXAMPLE 8

To a reactor equipped with an agitator, a reflux cooler, a dropping tank and a thermometer, 300 parts of water was charged and inside of the reactor was heated to 80° C. Then, 25 parts of a 25% aqueous solution of "Quartamin 24W" (trade name of a cationic surfactant from Kao Corp.), 7 parts of a 70% aqueous solution of "Emulgen 1135S-70" (trade name of a nonionic surfactant from Kao Corp.) and 4 part of a 70% aqueous solution of quaternary methyl chloride salt of N,N-dimthylaminopropylacrylamide were added to said reactor. Furthermore, 8 parts of a 5% aqueous solution of 2,2'-azobis(2-methylpropionamidine) dibasic acid salt were charged into said reactor. After 5 minutes, a mixture of 10 parts of methyl methacrylate, 10 parts of butyl acrylate, 10 parts of styrene and 2 parts of ethyl 2-hydroxymethacrylate were added continuously to said reactor over 30 minutes, while keeping the temperature inside the reactor at 80° C. A number average particle diameter of the emulsion at this stage was 16 nm. Then, a mixture of 40 parts of N-isopropylacrylamide, 1 part of a 70% aqueous solution of quaternary methyl chloride salt of N,N-dimthylaminopropylacrylamide, 2 parts of ethyl 2-hydroxymethacrylate, 2 parts of diacetoneacrylamide, 0.1 parts of methylenebisacrylamide, 3 parts of a 25% aqueous solution of "Quartamin 86W" and 4 parts of a 5% aqueous solution of 2,2'-azobis (2-methylpropionamidine) dibasic acid salt were started to be added to said reactor. The addition was completed over 4 hours. Further, a mixture of 38 parts of acrylamide, 1 part of a 70% aqueous solution of quaternary methyl chloride salt of N,N-dimthylaminopropylacrylamide, 4 parts of ethyl 2-hydroxymethacrylate, 2 parts of diacetoneacrylamide, 0.1 parts of methylenebisacrylamide, 3 parts of a 25% aqueous solution of "Quartamin86W" and 4 parts of a 5% aqueous solution of 2,2'-azobis (2-methylpropionamidine) dibasic acid salt dissolved in 200 parts of water were started to be added to said reactor. The addition was completed over 4 hours. During the addition and till 1 hour after completion of the addition, a liquid temperature inside the reactor was kept at 80° C., then lowered to and kept at 50° C. to obtain a binder (h) forming an emulsion with a solid resin content of 14% and a number average particle diameter of 120 nm. The temperature-sensitive point of the binder was measured and found to be 30° C.

REFERENCE EXAMPLE 9

To a reactor equipped with an agitator, a reflux cooler, a dropping tank and a thermometer, 45 parts of water were charged and the inside of the reactor was heated to 80° C. Then, 0.3 part of a 25% aqueous solution of "Adeka reasoap SE1025N" (trade name of a surfactant from Asahi Denka Kogyo K.K.) and 0.5 part of a 2% aqueous solution of ammonium persulfate were added. After 5 minutes, a pre-emulsion of 2 parts of methyl methacrylate, 2 parts of butyl acrylate, 0.8 part of a 25% aqueous solution of "Adeka reasoap SE1025N", 1 part of a 2% solution of ammonium persulfate and 10 parts of water, prepared by a homogenizer and a solution of 40 parts of N-isopropylacrylamide and 1.5 parts of polyvinyl alcohol, "Kuraray Poval PVA117" (trade name: from Kuraray Co., Ltd., having a saponification value of 99 mol % and a degree of polymerization of 1,700) dissolved in 160 parts of water were each started to be added. The addition was completed over 4 hours. During the addition and till 1 hour after completion of the addition, a liquid temperature inside the reactor was kept at 80° C., then lowered to and kept at 50° C. to obtain a binder (i) forming an emulsion with a solid resin content of 16% and a number average particle diameter of 150 nm at 50° C. The temperature-sensitive point of the binder was measured and found to be 30° C.

REFERENCE EXAMPLE 10

To a reactor equipped with an agitator, a reflux cooler, a dropping tank and a thermometer, 360 parts of water were charged and the inside of the reactor was heated to 80° C. Then, 25 parts of a 25% aqueous solution of "Quartamin 86W" (trade name of a cationic surfactant from Kao Corp.), 7.5 parts of a 70% aqueous solution of "Emulgen 1135S-70" (trade name of a nonionic surfactant from Kao Corp.) and 4 part of a 70% aqueous solution of quaternary methyl chloride salt of N,N-dimthylaminopropylacrylamide were added to said reactor. Furthermore, 8 parts of a 5% aqueous solution of 2,2'-azobis(2-methylpropionamidine) dibasic acid salt were charged into said reactor. After 5 minutes, a mixture of 9 parts of methyl methacrylate, 9 parts of butyl acrylate, 9 parts of styrene, 2 parts of diacetoneacrylamide and 2 parts of ethyl 2-hydroxymethacrylate were added continuously to said reactor over 30 minutes, while keeping the temperature inside the reactor at 80° C. A number average particle diameter of the emulsion at this stage was 11 nm. Then, a mixture of 290 parts of N-isopropylacrylamide, 10 parts of diacetoneacrylamide, 10 part of a 70% aqueous solution of N,N-dimthylaminopropylacrylamide, 0.5 part of methacrylic acid, 10 parts of a 25% aqueous solution of "Quartamin 86W", 15 parts of a 25% aqueous solution of "Blemer QA" (trade name of a cationic reactive surfactant from NOF CORP.) and 11 parts of a 5% aqueous solution of 2,2'-azobis(2-methylpropionamidine) dibasic acid salt dissolved in 1,254 parts of water were started to be added to said reactor. The addition was completed over 4 hours. During the addition and till 1 hour after completion of the addition, the liquid temperature inside the reactor was kept at 80° C., then cooled to 50° C., followed by gradual addition of 1,000 parts of a 60% aqueous ethanol solution. A binder (j) forming an emulsion with a solid resin content of 11% and a number average particle diameter of 100 nm was obtained by cooling to room temperature after completion of the addition of ethanol solution. The temperature-sensitive point of the binder was measured and found to be 30° C.

REFERENCE EXAMPLE 11

In a reactor equipped with an agitator, a reflux cooler, a dropping tank and a thermometer, 100 parts of benzene, 10 parts of N-isopropylacrylamide, 1 part of diacetoneacrylamide, 1 part of a 5% aqueous solution of 2,2'-azobis(2-methylpropionamidine) dibasic acid salt and 0.1 part of a 70% aqueous solution of N,N-dimethylaminopropylacrylamide were mixed, and after nitrogen purge at room temperature, they were reacted at 50° C. for 8 hours, followed by evaporation of benzene under reduced pressure. The reaction mixture was dissolved in acetone, poured into a large quantity of n-hexane to recover a precipitate. After acetone and n-hexane were removed from the precipitate under reduced pressure, the precipitate was dissolved in water at 20° C. so that the solid content becomes 10% to obtain a binder (k). The temperature-sensitive point of the binder was measured and found to be 31° C.

REFERENCE EXAMPLE 12

To a reactor equipped with an agitator, a reflux cooler, a dropping tank and a thermometer, 650 parts of water were charged and the inside of the reactor was heated to 80° C. Then, 7 parts of a 25% aqueous solution of "Adeka reasoap SE1025N" and 14 parts of a 2% aqueous solution of ammonium persulfate were added. After 5 minutes, a pre-emulsion of 360 parts of methyl methacrylate, 540 parts of butyl acrylate, 18 part of methacrylic acid, 40 parts of a 25% aqueous solution of "Adeka reasoap SE1025N", 45 parts of a 2% solution of ammonium persulfate and 450 parts of water, prepared by a homogenizer, were started to be added to the reactor. The addition was completed over 4 hours.

During the addition and till 1 hour after completion of the addition, the liquid temperature inside the reactor was kept at 80° C., then cooled to room temperature to obtain a binder (1) forming an emulsion with a solid resin content of 43% and a number average particle diameter of 100 nm. Measurement of the temperature-sensitive point of the binder was tried, but no change judged to be the temperature-sensitive point occurred.

REFERENCE EXAMPLE 13

To a reactor equipped with an agitator, a reflux cooler, dropping tanks and a thermometer, 600 parts of water, 40 parts of a 28% aqueous solution of "Quartamin 86W" and 6 parts of a 70% aqueous solution of quaternary methyl chloride salt of N,N-dimthylaminopropylacrylamide were charged and the inside of the reactor was heated to 70° C. Then, an addition liquid (1) composed of 4 parts of diacetoneacrylamide, 128 parts of styrene, 80 parts of methyl methacrylate and 66 parts of butyl acrylate and an addition liquid (2) composed of 9 parts of a 28% aqueous solution of "Quartamin 86W", 1 part of 70% aqueous solution of "Emulgen1135S-70", 45 parts of 5% aqueous solution of 2,2'-azobis (2-methylpropionamidine) dibasic acid salt and 6 parts of a 70% aqueous solution of quaternary methyl chloride salt of aminoethyl methacrylate, dissolved in 100 parts of water were each added from the dropping tanks to the reactor over 4 hours. During the addition and a further 2 hours after completion of the addition, the liquid temperature inside the reactor was kept at 70° C., then cooled to room temperature to obtain a binder (m) forming an emulsion with a solid resin content of 30% and a number average particle diameter of 40 nm. Measurement of the temperature-sensitive point of the binder was tried, but no change judged to be the temperature-sensitive point occurred.

REFERENCE EXAMPLE 14

<Synthesis Example of a Polymethylenecarbazide Compound (PSC)>

In 130 parts of a 1:1 (ratio by weight) mixed solvent of 2-methoxyethyl acetate and trimethyl phosphate, 168 parts of hexamethylene diisocyanate and 1.5 parts of water as a biuret agent were dissolved, and the mixture was reacted at 160° C. for 1 hour. Excess hexamethylene diisocyanate and the solvent were removed and recovered from the resulting reaction mixture, using a thin film distillation still, through two treatments under conditions of 133 Pa/160° C. and 13.3 Pa/200° C. at the first and the second treatments, respectively, to obtain a residual product. The residual product contained 99.9% by weight of polyisocianate (biuret type of polyisocianate of hexamethylene diisocyanate) and 0.1% by weight of residual hexamethylene diisocyanate. The viscosity of residual product was 1,900 (±200) mPa·s/25° C. The number average molecular weight was about 600 (±100). The average number of —NCO functional groups was about 3.3 and the content of —NCO groups was 23.3% by weight.

In a reactor equipped with a reflux cooler, a thermometer and an agitator containing 1,000 parts of isopropyl alcohol, 80 parts of hydrazine mono hydrate were added under stirring at room temperature over about 30 minutes, followed by addition of a solution of 144 parts of the above-described polyisocianate (a content of NCO group of 23.3% by weight) dissolved in 576 parts of tetrahydrofuran at 10° C. over about 1 hour. Then, after continuous stirring at 40° C. for 3 hours, 1,000 parts of water were added. Subsequently, isopropanol, hydrazine, tetrahydrofuran and water in the reaction mixture were distilled off by heating under reduced pressure to obtain 168 parts of a polymethylenecarbazide compound (PSC) with a biuret structure. The average number of semicarbzide residues was measured and found to be 4.6 meq/g.

REFERENCE EXAMPLE 15

In 100 g of water containing a dispersion of 100 g of a cation exchange resin (trade name: Amberlite IR-120B from Rohm & Haas Corp.), which was converted to $H^+$ type in advance; a solution of 33.3 g of No. 3 water glass ($SiO_2$=29% by weight, $Na_2O$=9.5% by weight) diluted with 66.7 g of water was added. After sufficient stirring of this solution, the cation exchange resin was filtered off to obtain 200 g of aqueous activated silica solution. The content of $SiO_2$ in this aqueous activated silica solution was 5.0% by weight.

In 1,360 g of water, 5 gram of "Pluronic P103" from Asahi Denka K.K. was dissolved, then 60 g of the above-described aqueous activated silica solution were added at 35° C. under stirring in a hot water bath. Further, 20 ml of 0.015 mol/l aqueous NaOH solution was added. The mixture had a pH of 7.5. After 15 minutes of stirring at 35° C., the mixture was reacted for 24 hours by leaving it standing at 80° C. The nonionic surfactant was removed from this solution using ultrafiltration equipment to obtain a dispersion of transparent porous material (I) with a silica concentration of 4% by weight. This dispersion had an average particle diameter of 60 nm as measured by a dynamic light scattering method, and a reduced specific surface area of 45 $m^2/g$. A sample obtained by drying said dispersion at 105° C. showed an average pore diameter of 8 nm by a BJH method, a pore volume of 1.21 ml/g, a specific surface area of 720 $m^2/g$ by nitrogen adsorption using a BET method and a difference from the reduced specific surface area of 675 $m^2/g$. This sample did not show any peak in an X-ray diffraction chart.

REFERENCE EXAMPLE 16

In 300 g of water containing a dispersion of 300 g of a cation exchange resin (trade name: Amberlite IR-120B from Rohm & Haas Corp.), which was converted to $H^+$ type in advance, a solution of 100 g of No. 3 water glass (silica=30% by weight, $Na_2O$=9.5% by weight) diluted with 200 g of water was added. After sufficient stirring of this solution, the cation exchange resin was filtered off to obtain 600 g of aqueous activated silica solution. The silica content of this aqueous activated silica solution was 5% by weight. This solution was diluted with 1,675 g of purified water (called liquid A). Separately, a mixture of 500 g of aqueous solution containing 50 g of "Pluronic P123", 200 g of 0.015 mol/l aqueous NaOH solution and 25 g of trimethylbenzene were heated at 60° C. for 1 hour under stirring to obtain a transparent liquid (called liquid B). The liquid B was added drop-wise to the liquid A, followed by heating at 80° C. for 24 hours to obtain a composite solution. P123 was removed from this solution using ultrafiltration equipment to obtain a dispersion of porous material with a content of about 7.5% by weight. To said liquid, an aqueous solution of 1% by weight sodium aluminate was added so that the atomic ratio of Al/Si became 0.01, followed by heating at 80° C. for 24 hours to obtain a dispersion of aluminium-modified porous material (II).

Said dispersion had an average particle diameter of 195 nm, as measured by a dynamic light scattering method and a reduced specific surface area of 15 $m^2/g$. A sample obtained by drying said dispersion at 105° C. showed an average pore diameter of 18 nm by a BJH method, a pore volume of 1.67 ml/g, a specific surface area of 413 $m^2/g$ by nitrogen adsorption using a BET method and a difference from reduced specific surface area of 398 $m^2/g$. This sample did not show any peak in an X-ray diffraction chart.

EXAMPLE 1

The dispersion of porous material (II) obtained in Reference Example 16 was heated at 60° C., followed by addition and mixing of the binder (a) obtained in Reference Example 1, in a ratio of porous material (II)/binder (a)=100/25 (as a ratio by dry weight), and further mixing of an aqueous 5% by weight of adipic acid dihydrazide (ADH) solution at 60° C. in a ratio of ADH/binder (a)=2/100 (as a ratio by dry weight) to prepare a coating liquid. On a polyethylene terephthalate sheet (thickness of 100 μm), subjected to hydrophilization treatment on surface in advance, the above-described coating liquid was applied at 60° C. using a bar coater heated at 60° C., then rapid cooling was started by blowing cold air at 10° C. onto the surface of the coated film. After starting the cold air blow, the coating film quickly gelled and maintained uniform film thickness and smooth surface. After the blowing of cold air for 1 minute, warm air at 60° C. was blown onto the surface of the coated film. The coated film was substantially dried in about 8 minutes after starting the warm air blow to give a recording sheet provided with an ink absorption layer with a thickness of about 25 μm. Evaluation results of this sheet are shown in Table 1.

EXAMPLE 2

To a dispersion of the porous material (II) obtained in Reference Example 16, an aqueous solution of 20% by weight of a cationic polymer (trade name: Adeka catioace DM-20A from Asahi Denka Kogyo K.K.) was added so as to provide a porous material (II)/cationic polymer=100/8 (as a ratio by dry weight). Then the polymer was dispersed using ultrasonic dispersion equipment. Said dispersion was heated at 60° C., then added and mixed with the binder (b) obtained in Reference Example 2 in a ratio of porous material (II)/binder (b)=100/25 (as a ratio by dry weight), and further mixed with an aqueous solution of 5% by weight of adipic acid dihydrazide (ADH) in a ratio of ADH/binder (b)=2/100 (as a ratio by dry weight) at 60° C., to prepare a coating liquid. On a polyethylene terephthalate sheet (thickness of 100 μm), subjected to hydrophilization treatment on a surface in advance, the above-described coating liquid was applied at 60° C. using a bar coater heated at 60° C., then rapid cooling was started by blowing cold air at 10° C. onto the surface of the coated film. After starting the cold air blow, the coated film quickly gelled and maintained uniform film thickness and smooth surface. After the blowing of cold air for 1 minute, warm air at 60° C. was blown onto the surface of the coated film. The coated film was substantially dried in about 8 minutes after starting the warm air blow to give a recording sheet provided with an ink absorption layer with a thickness of about 25 μm. Evaluation results of this sheet are shown in Table 1.

EXAMPLE 3

The dispersion of porous material (II) obtained in Reference Example 16 was heated at 60° C., followed by addition of the binder (c) obtained in Reference Example 3, in a ratio of porous material (II)/binder (c)=100/25 (as a ratio by dry weight), and further mixing at 60° C. to prepare a coating liquid. On a polyethylene terephthalate sheet (thickness of 100 μm), subjected to hydrophilization treatment on surface in advance, the above-described coating liquid was applied at 60° C. using a bar coater heated at 60° C., then rapid cooling was started by blowing cold air at 10° C. onto a surface of the coated film. After starting the cold air blow, the coated film quickly gelled and maintained uniform film thickness and smooth surface. After the blowing of cold air for 1 minute, warm air at 60° C. was blown onto the surface of the coated film. The coated film was substantially dried in about 8 minutes after starting the warm air blow to give a recording sheet provided with an ink absorption layer with a thickness of about 25 μm. Evaluation results of this sheet are shown in Table 1.

EXAMPLE 4

A recording sheet was obtained by a similar method as in Example 2 except for using a binder (d) obtained in Reference Example 4 instead of a binder (b) in Example 2. Evaluation results of this sheet are shown in Table 1.

EXAMPLE 5

A recording sheet was obtained by a similar method as in Example 1 except for using a binder (e) obtained in Reference Example 5 instead of a binder (a) in Example 1. Evaluation results of this sheet are shown in Table 1.

EXAMPLE 6

A recording sheet was obtained by a similar method as in Example 3 except for using a binder (f) obtained in Reference Example 6 instead of a binder (c) in Example 3. Evaluation results of this sheet are shown in Table 1.

EXAMPLE 7

A recording sheet was obtained by a similar method as in Example 2 except for using a binder (g) obtained in Reference Example 7 instead of a binder (b) in Example 2. Evaluation results of this sheet are shown in Table 1.

EXAMPLE 8

A recording sheet was obtained by a similar method as in Example 2 except for using a binder (h) obtained in Reference Example 8 instead of a binder (b) in Example 2. Evaluation results of this sheet are shown in Table 1.

EXAMPLE 9

A recording sheet was obtained by a similar method as in Example 3 except for using a binder (i) obtained in Reference Example 9 instead of a binder (c) in Example 3. Evaluation results of this sheet are shown in Table 1.

EXAMPLE 10

A recording sheet was obtained by a similar method as in Example 2 except for using a binder (j) obtained in Reference Example 10 instead of a binder (b) in Example 2. Evaluation results of this sheet are shown in Table 1.

EXAMPLE 11

A recording sheet was obtained by a similar method as in Example 3 except for using the dispersion of porous material (I) obtained in Reference Example 15 instead of the dispersion of porous material (II) in Example 3. Evaluation results of this sheet are shown in Table 1.

EXAMPLE 12

A recording sheet was obtained by a similar method as in Example 2 except for using the dispersion of porous material (I) obtained in Reference Example 15 instead of the dispersion of porous material (II) in Example 2. Evaluation results of this sheet are shown in Table 1.

EXAMPLE 13

To a dispersion of the porous material (II) obtained in Reference Example 16, an aqueous solution of 20% by weight of a cationic polymer (trade name: Adeka catioace DM-20A from Asahi Denka Kogyo K.K.) was added so as to provide a porous material (II)/cationic polymer=100/8 (as a ratio by dry weight). Then the polymer was dispersed using ultrasonic dispersion equipment. Said dispersion was heated at 60° C., then added and mixed with the binder (b) obtained in Reference Example 2 in a ratio of porous material (II)/binder (b)=100/25 (as a ratio by dry weight), and further mixed with an aqueous solution of 5% by weight of adipic acid dihydrazide (ADH) in a ratio of ADH/binder (b)=2/100 (as a ratio by dry weight) at 60° C., to prepare a coating liquid. On a polyethylene terephthalate sheet (thickness of 100 μm), subjected to hydrophilization treatment on a surface in advance, the above-described coating liquid was applied at 60° C. using a bar coater heated at 60° C. Then rapid cooling was started by blowing cold air at 10° C. onto the surface of the coated film. After starting the cold air blow, the coated film quickly gelled and maintained uniform film thickness and smooth surface. After the blowing of cold air for 1 minute, warm air at 60° C. was blown onto the surface of the coated film for about 1 minute. Then warm air at 90° C. was blown onto the surface of the coated film. The coated film was substantially dried in about 4 minutes after starting the warm air blow to give a recording sheet provided with an ink absorption layer with a thickness of about 25 μm. Evaluation results of this sheet are shown in Table 1.

EXAMPLE 14

A recording sheet was obtained by a method, similar to that of Example 12, except for using a polysemicarbazide compound (PSC) obtained in Reference Example 14 instead of adipic acid dihydrazide (ADH) in Example 12. Evaluation results of this sheet are shown in Table 1.

EXAMPLE 15

Fumed silica (trade name: A300 from Japan Aerosil Co., Ltd.) was dispersed in water using ultrasonic dispersing equipment, so that a solid concentration became 18% by weight. Then an aqueous solution of 20% by weight of a cationic polymer (trade name: Adeka catioace DM-20A from Asahi Denka Kogyo K.K.) was added so as to provide a fumed silica/cationic polymer=100/5 (as a ratio by dry weight), and dispersed again using an ultrasonic dispersing equipment. Said dispersion was heated at 60° C., then added and mixed with the binder (b) obtained in Reference Example 2 in a ratio of fumed silica/binder (b)=100/25 (as a ratio by dry weight), and further mixed with an aqueous solution of 5% by weight of adipic acid dihydrazide (ADH) in a ratio of ADH/binder (b)=2/100 (as a ratio by dry weight) at 60° C., to prepare a coating liquid. On a polyethylene terephthalate sheet (thickness of 100 μm), subjected to hydrophilization treatment on a surface in advance, the above-described coating liquid was applied at 60° C. using a bar coater heated at 60° C. Then rapid cooling was started by blowing cold air at 10° C. onto the surface of the coated film. After starting the cold air blow, the coated film quickly gelled and maintained uniform film thickness and smooth surface. After the blowing of cold air for 1 minute, warm air at 60° C. was blown onto the surface of coating film. The coated film was substantially dried in about 8 minutes after starting the warm air blow to give a recording sheet provided with an ink absorption layer with a thickness of about 25 μm. Evaluation results of this sheet are shown in Table 1.

EXAMPLE 16

Fumed silica (trade name: A300 from Japan Aerosil Co., Ltd.) was dispersed in water using ultrasonic dispersing equipment, so that a solid concentration became 18% by weight, then an aqueous solution of 20% by weight of a cationic polymer (trade name: Adeka catioace DM-20A from Asahi Denka Kogyo K.K.) was added so as to be fumed silica/cationic polymer=100/5 (as a ratio by dry weight), and dispersed again using an ultrasonic dispersing equipment. Separately, a dispersion of the porous material (I) obtained in Reference Example 15, was added with 20% by weight of an aqueous solution of a cationic polymer (trade name: Adeka catioace DM-20A from Asahi Denka Kogyo K.K.) so as to provide porous material (I)/cationic polymer=100/8 (as a ratio by dry weight), and dispersed by using an ultrasonic dispersing equipment. Said dispersion of fumed silica treated with a cationic polymer and a dispersion of said porous material (I) treated with a cationic polymer, were mixed in a ratio of fumed silica/porous material (I)=50/50 (as a ratio by dry weight). Said mixture was heated at 60° C., then added and mixed with a binder (b) obtained in Reference Example 2 in a ratio of [fumed silica+porous material (I)]/binder (b)=100/25 (as a ratio by dry weight), and further mixed with an aqueous solution of 5% by weight of adipic acid dihydrazide (ADH) in a ratio of ADH/binder (b)=2/100 (as a ratio by dry weight) at 60° C., to prepare a coating liquid. On a polyethylene terephthalate sheet (thickness of 100 μm), subjected to hydrophilization treatment on a surface in advance, the above-described coating liquid was applied at 60° C. using a bar coater heated at 60° C. Then rapid cooling was started by blowing cold air at 10° C. onto the surface of coating film. After starting the cold air blow, the coated film quickly gelled and maintained uniform film thickness and smooth surface. After the blowing of cold air for 1 minute, warm air at 60° C. was blown onto the surface of the coated film. The coated film was substantially dried in about 8 minutes after starting the warm air blow to give a recording sheet provided with an ink absorption layer with a thickness of about 25 μm. Evaluation results of this sheet are shown in Table 1.

EXAMPLE 17

Separately, a dispersion of the porous material (I) obtained in Reference Example 15, was added to a 20% by weight of aqueous solution of a cationic polymer (trade name: Adeka catioace DM-20A from Asahi Denka Kogyo K.K.) so as to provide a porous material (I)/cationic polymer=100/8 (as a ratio by dry weight), and dispersed by using ultrasonic dispersing equipment. Said dispersion was heated at 60° C., then mixed with a binder (b) obtained in Reference Example 2 in a ratio of fumed silica/binder (b)=100/20 (as a ratio by dry weight), further added and mixed with polyvinyl alcohol (trade name: Kuraray Poval PVA235 from Kuraray Co., Ltd.) in a ratio of fumed silica/polyvinyl alcohol=100/10, still further mixed with an aqueous solution of 5% by weight of adipic acid dihydrazide (ADH) in a ratio of ADH/binder (b)=2/100 (as a ratio by dry weight) at 60° C., to prepare a coating liquid. On a polyethylene terephthalate sheet (thickness of 100 μm), subjected to hydrophilization treatment on a surface in advance, the above-described coating liquid was applied at 60° C. using a bar coater heated at 60° C. Then rapid cooling was started by blowing cold air at 10° C. onto the surface of the coated film. After starting the cold air blow, the coated film quickly gelled and maintained uniform film thickness and smooth surface. After the blowing of cold air for 1 minute, warm air at 60° C. was blown onto the surface of the coated film. The coated film was substantially dried in about 8 minutes after starting the warm air blow to give a recording sheet provided with an ink absorption layer with a thickness of about 25 μm. Evaluation results of this sheet are shown in Table 1.

EXAMPLE 18

Fumed silica (trade name: A300 from Japan Aerosil Co., Ltd.) was dispersed in water using ultrasonic dispersing equipment, so that a solid concentration became 18% by weight, then an aqueous solution of 20% by weight of a cationic polymer (trade name: Adeka catioace DM-20A from Asahi Denka Kogyo K.K.) was added so as to provide fumed silica/cationic polymer=100/5 (as a ratio by dry weight), and dispersed again using ultrasonic dispersing equipment. Said dispersion was heated at 60° C., then added and mixed with a binder (b) obtained in Reference Example 4 in a ratio of fumed silica/binder (b)=100/25 (as a ratio by dry weight), and further mixed with an aqueous solution of 5% by weight of adipic acid dihydrazide (ADH) in a ratio of ADH/binder (b)=2/100 (as a ratio by dry weight) at 60° C., to prepare a coating liquid. On a polyethylene terephthalate sheet (thickness of 100 μm), subjected to hydrophilization treatment on a surface in advance, the above-described coating liquid was applied at 60° C. using a bar coater heated at 60° C. Then rapid cooling was started by blowing cold air at 10° C. onto the surface of the coated film. After starting the cold air blow, the coated film quickly gelled and maintained uniform film thickness and smooth surface. The coated film was substantially dried in about 20 minutes after starting the cold air blow to give a recording sheet provided with an ink absorption layer with a thickness of about 25 μm. Evaluation results of this sheet are shown in Table 1.

EXAMPLE 19

Fumed silica (trade name: A300 from Japan Aerosil Co., Ltd.) was dispersed in water using ultrasonic dispersing equipment, so that a solid concentration became 18% by weight, then an aqueous solution of 20% by weight of a cationic polymer (trade name: Adeka catioace DM-20A from Asahi Denka Kogyo K.K.) was added so as to provide a fumed silica/cationic polymer=100/5 (as a ratio by dry weight), and dispersed again using an ultrasonic dispersing equipment. Said dispersion was heated at 60° C., then mixed with a binder (b) obtained in Reference Example 2 in a ratio of fumed silica/binder (b)=100/25 (as a ratio by dry weight), and further mixed with an aqueous solution of 5% by weight of adipic acid dihydrazide (ADH) in a ratio of ADH/binder (b)=2/100 (as a ratio by dry weight) at 60° C., to prepare a coating liquid. On a polyethylene terephthalate sheet (thickness of 100 μm), subjected to hydrophilization treatment on a surface in advance, the above-described coating liquid was applied at 60° C. using a bar coater heated at 60° C. Then a rapid air blow was started by blowing warm air at 60° C. onto the surface of the coated film. After starting the air blow, the coated film did not show quick thickening. Unevenness of the coated film called “liquid localization” was observed. The air blow at 60° C. was further continued to the surface of the coated film, which was substantially dried in about 10 minutes after starting the warm air blow to give a recording sheet provided with an ink absorption layer with an uneven thickness of about 10–15 μm. Evaluation results of this sheet are shown in Table 1.

EXAMPLE 20

Colloidal silica (trade name: PS-S from Nissan Chemical Ind. Ltd.) was dispersed in water at a solid concentration of 12% by weight. Said dispersion was heated at 60° C., then mixed with a binder (a) obtained in Reference Example 1 in a ratio of silica/binder (a)=100/25 (as a ratio by dry weight), and further mixed with an aqueous solution of 5% by weight of adipic acid dihydrazide (ADH) in a ratio of ADH/binder (a)=2/100 (as a ratio by dry weight) at 60° C., to prepare a coating liquid. On a polyethylene terephthalate sheet (thickness of 100 μm), subjected to hydrophilization treatment on a surface in advance, the above-described coating liquid was applied at 60° C. using a bar coater heated at 60° C. Then rapid cooling was started by blowing cold air at 10° C. onto the surface of coating film. After starting the cold air blow, the coated film quickly gelled and maintained uniform film thickness and smooth surface. After the blowing of cold air for 1 minute, warm air at 60° C. was blown onto the surface of coating film. The coating film was substantially dried in about 8 minutes after starting the warm air blow to give a recording sheet provided with an ink absorption layer with a thickness of about 25 μm. Evaluation results of this sheet are shown in Table 1.

COMPARATIVE EXAMPLE 1

The dispersion of porous material (I) obtained in Reference Example 15 was heated at 60° C., then added and mixed with polyvinyl alcohol (trade name: Kuraray Poval PVA235 from Kuraray Co., Ltd.) in a ratio of porous material (I)/polyvinyl alcohol=100/25 (as a ratio by dry weight), and further mixed with an aqueous solution of boric acid/borax/water in a ratio by weight of 1/1/18 at 60° C. so as to provide a polyvinyl alcohol/(boric acid+borax)=20/1 (as a ratio by dry weight) to prepare a coating liquid. On a polyethylene terephthalate sheet (thickness of 100 μm), subjected to hydrophilization treatment on a surface in advance, the above-described coating liquid was applied at 60° C. using a bar coater heated at 60° C. Then rapid cooling was started by blowing cold air at 10° C. onto the surface of the coating film. After starting the cold air blow, a phenomenon was observed that the coating film was quickly thickened. After the blowing of cold air for 30 seconds, warm air at 60° C. was blown to the surface of coated film. The coating film was substantially dried in about 8 minutes after starting the warm air blow to give a recording sheet provided with an ink absorption layer with a thickness of about 25 μm. Evaluation results of this sheet are shown in Table 1.

COMPARATIVE EXAMPLE 2

To the dispersion liquid of porous material (I) obtained in Reference Example 15, an aqueous solution of 20% by weight of a cationic polymer (trade name: Adeka catioace DM-20A from Asahi Denka Kogyo K.K.) was added so as to provide a porous material (I)/cationic polymer=100/8 (as a ratio by dry weight), then dispersed using ultrasonic dispersion equipment. Said dispersion was held at 20° C., then mixed with the binder (k) obtained in Reference Example 11 in a ratio of fumed silica/binder (k)=100/30 (as a ratio by dry weight), and dispersed again using ultrasonic dispersion equipment. The dispersion was mixed with an aqueous solution of 5% by weight of adipic acid dihydrazide (ADH) at 20° C. in a ratio of ADH/binder (k)=2/100 (as a ratio by dry weight) to prepare a coating liquid. On a polyethylene terephthalate sheet (thickness of 100 μm), subjected to hydrophilization treatment on a surface in advance, the above-described coating liquid was applied at 20° C. using a bar coater. Then a rapid air blow was started by blowing warm air at 60° C. onto the surface of the coated film. After starting the warm air blow, minute agglomerates occurred, and a smooth surface could not be maintained. The coated film was substantially dried in about 8 minutes after starting the warm air blow to give a recording sheet provided with an ink absorption layer with a thickness of about 25 μm. Evaluation results of this sheet are shown in Table 1.

COMPARATIVE EXAMPLE 3

The dispersion of porous material (I) obtained in Reference Example 15 was heated at 60° C., then mixed with a binder (l) obtained in Reference Example 12, in a ratio of porous material (I)/binder (l)=100/25 (as a ratio by dry weight) and mixed at 60° C. to prepare a coating liquid. On a polyethylene terephthalate sheet (thickness of 100 μm), subjected to hydrophilization treatment on a surface in advance, the above-described coating liquid was applied at 60° C. using a bar coater heated at 60° C. Then a rapid air blow was started by blowing cold air at 10° C. onto the surface of the coated film. After starting the air blow, the coated film did not show thickening and unevenness of coating film called "liquid localization". After the blowing of cold air for 1 minute, subsequently warm air at 60° C. was blown onto the surface of the coated film. The coated film was substantially dried in about 8 minutes after starting the warm air blow to give a recording sheet provided with an ink absorption layer with an uneven thickness of about 10–15 μm. Evaluation results of this sheet are shown in Table 1.

COMPARATIVE EXAMPLE 4

Fumed silica (trade name: A300 from Japan Aerosil Co., Ltd.) was dispersed in water using ultrasonic dispersing equipment so that a solid concentration became 18% by weight, and the dispersion was added with an aqueous solution of 20% by weight of a cationic polymer (trade name: Adeka catioace DM-20A from Asahi Denka K.K.) so as to provide a fumed silica/cationic polymer=100/5 (as a ratio by dry weight), then dispersed again using ultrasonic dispersion equipment. Said dispersion was heated at 60° C., and added and mixed with a binder (m) obtained in Reference Example 13 in a ratio of fumed silica/binder (m)=100/25 (as a ratio by dry weight), then further mixed with an aqueous solution of 5% by weight of adipic acid dihydrazide (ADH) so as to be ADH/binder (m)=2/100 (as a ratio by dry weight) at 60° C., to prepare a coating liquid. On a polyethylene terephthalate sheet (thickness of 100 μm), subjected to hydrophilization treatment on a surface in advance, the above-described coating liquid was applied at 60° C. using a bar coater heated at 60° C. Then a rapid air blow was started by blowing cold air at 10° C. onto a surface of coating film. After starting the air blow, the coated film did not show thickening and unevenness of coated film called "liquid localization" was observed. After the blowing of cold air for 1 minute, subsequently warm air at 60° C. was blown to the surface of coating film. The coating film was substantially dried in about 8 minutes after starting the warm air blow to give a recording sheet provided with an ink absorption layer with an uneven thickness of about 10–15 μm. Evaluation results of this sheet are shown in Table 1.

COMPARATIVE EXAMPLE 5

The dispersion liquid of porous material (II) obtained in Reference Example 16 was added and mixed with a binder (c) obtained in Reference Example 3, both at 20° C., in a ratio of porous material (II)/binder (c)=100/25 (as a ratio by dry weight) to prepare a coating liquid. On a polyethylene terephthalate sheet (thickness of 100 μm), subjected to hydrophilization treatment on a surface in advance, the above-described coating liquid was applied at 20° C. using a bar coater. This coating film showed gelling and could not provide an uniform coating film. Warm air at 60° C. was blown to the coating film. The coating film was substantially dried in about 20 minutes after starting warm air blow to give a recording sheet provided with an ink absorption layer with an uneven thickness of about 10–25 μm. Evaluation results of this sheet are shown in Table 1.

TABLE 1

| | Binder | Fine Particle (c) | Water Soluble Resin | Coating Temp. (° C.) | Cooling | Drying Time (min) | Film Forming Ability | Trans-parency | Water Resistance of Coating Film | Ink Absorption |
|---|---|---|---|---|---|---|---|---|---|---|
| Example 1 | (a) | (II) | — | 60 | Yes | 8 | 7 | 10 | 9 | 9 |
| Example 2 | (b) | (II) | — | 60 | Yes | 8 | 9 | 9 | 9 | 9 |
| Example 3 | (c) | (II) | — | 60 | Yes | 8 | 7 | 10 | 7 | 9 |
| Example 4 | (d) | (II) | — | 60 | Yes | 8 | 7 | 8 | 9 | 9 |
| Example 5 | (e) | (II) | — | 60 | Yes | 8 | 6 | 7 | 9 | 9 |
| Example 6 | (f) | (II) | — | 60 | Yes | 8 | 5 | 5 | 8 | 10 |
| Example 7 | (g) | (II) | — | 60 | Yes | 8 | 6 | 7 | 9 | 9 |
| Example 8 | (h) | (II) | — | 60 | Yes | 8 | 7 | 10 | 8 | 9 |
| Example 9 | (i) | (II) | — | 60 | Yes | 8 | 8 | 9 | 8 | 9 |
| Example 10 | (j) | (II) | — | 60 | Yes | 8 | 10 | 9 | 9 | 9 |
| Example 11 | (c) | (I) | — | 60 | Yes | 8 | 6 | 10 | 8 | 8 |
| Example 12 | (b) | (I) | — | 60 | Yes | 8 | 7 | 9 | 9 | 8 |

TABLE 1-continued

| | Binder | Fine Particle (c) | Water Soluble Resin | Coating Temp. (° C.) | Cooling | Drying Time (min) | Film Forming Ability | Trans-parency | Water Resistance of Coating Film | Ink Absorption |
|---|---|---|---|---|---|---|---|---|---|---|
| Example 13 | (b) | (II) | — | 60 | Yes | 4 | 10 | 9 | 9 | 10 |
| Example 14 | (b) | (I) | — | 60 | Yes | 8 | 9 | 9 | 10 | 9 |
| Example 15 | (b) | A300 | — | 60 | Yes | 8 | 8 | 8 | 9 | 8 |
| Example 16 | (b) | (I) + A300 | — | 60 | Yes | 8 | 8 | 8 | 9 | 9 |
| Example 17 | (b) | (I) | PVA | 60 | Yes | 8 | 9 | 9 | 7 | 6 |
| Example 18 | (b) | A300 | — | 60 | Yes | 20 | 8 | 8 | 9 | 8 |
| Example 19 | (b) | A300 | — | 60 | No | 10 | 6 | 5 | 9 | 8 |
| Example 20 | (a) | PS-S | — | 60 | Yes | 8 | 8 | 8 | 9 | 6 |
| Comp. Example 1 | — | (I) | PVA | 60 | Yes | 8 | 3 | 5 | 5 | 5 |
| Comp. Example 2 | (k) | (I) | — | 60 | Yes | 8 | 3 | 2 | 5 | 5 |
| Comp. Example 3 | (l) | (I) | — | 60 | Yes | 8 | 1 | 1 | unmeasurable | unmeasurable |
| Comp. Example 4 | (m) | A300 | — | 60 | Yes | 8 | 1 | 1 | unmeasurable | unmeasurable |
| Comp. Example 5 | (c) | (II) | — | 20 | No | 20 | 2 | 2 | 5 | unmeasurable |

Binders (a)–(m) correspond to the binders obtained in Reference Examples 1–13, respectively.
Micro particle (C): See Table 2.
PVA: Polyvinyl alcohol (Trade name: Kuraray Poval PVA235 from Kuraray Co., Ltd.)

TABLE 2

| | Nitrogen Absorption Method | | Dynamic Light Scattering Method | | |
|---|---|---|---|---|---|
| Inorganic Fine Particle | Pore Diameter [nm] | Specific Surface Area [$m^2$/g] | Number Average Particle Diameter [nm] | Reduced Specific Surface Area [nm] | (SB-SL) |
| (I) | 8 | 720 | 60 | 45 | 675 |
| (II) | 18 | 413 | 195 | 15 | 398 |
| A300 | 18 | 290 | 98 | 28 | 262 |
| PS-S | 15 | 110 | 115 | 24 | 86 |

(I): Porous material obtained in Reference Example 15.
(II): Porous material obtained in Reference Example 16.
A300: Fumed silica (Trade name: Aerosil 300 from Japan Aerosil Co., Ltd.)
PS-S: Colloidal silica (Trade name: PS-S from Nissan Chemical Ind. Co., Ltd.)

INDUSTRIAL APPLICABILITY

This invention provides a recording medium superior in ink absorption, film forming ability, surface gloss and transparency, a coating liquid for said recording medium, a polymer emulsion used for said coating liquid and a method for manufacturing said polymer emulsion, and further an efficient method for manufacturing said recording medium.

The invention claimed is:

1. A coating liquid for recording medium containing a polymer emulsion used for manufacturing recording medium, comprising at least a polymer compound (A) which shows hydrophilicity at a temperature region not higher than a specific temperature (temperature-sensitive point) and lipophilicity in a temperature region above the temperature-sensitive point and wherein said polymer emulsion contains a carbonyl group, fine particles (C) and a hydrazine derivative having at least two hydrazine groups and/or semicarbazide groups.

2. The coating liquid for recording medium in accordance with claim 1, wherein said fine particles (C) have a number average particle diameter DL of 3–200 nm as determined by a dynamic light scattering method.

3. The coating liquid for recording medium in accordance with claim 1, wherein a difference of specific surface areas (SB-SL) of said fine particles (C) are not smaller than 100 $m^2$/g, wherein SB is a specific surface area as determined by nitrogen adsorption using a BET method and SL is a reduced specific surface area calculated from a number average particle diameter DL as measured by a dynamic light scattering method.

4. The coating liquid for recording medium in accordance with claim 1, wherein said fine particles (C) are manufactured using a metal oxide and/or a precursor thereof as a metal source, via the steps of (i) manufacturing a composite material by mixing and reacting the metal source, a template and water, and (ii) removing the template from said composite material, and said particles (C) have a number average particle diameter DL of 10–300 nm as measured by a dynamic light scattering method and a difference of specific surface areas (SB-SL) is not smaller than 250 $m^2$/g, wherein SB is a specific surface area as determined by nitrogen adsorption using a BET method and SL is a reduced specific surface area calculated from the number average particle diameter DL.

5. The coating liquid for recording medium in accordance with claim 1, wherein thickening or gelling occurs when temperature is lowered to a temperature not higher than a temperature-sensitive point.

6. The coating liquid for recording medium in accordance with claim 1, wherein said recording medium is an ink jet recording medium having at least one ink absorption layer on a substrate.

* * * * *